US005455688A

United States Patent [19]

Furukawa et al.

[11] Patent Number: 5,455,688

[45] Date of Patent: Oct. 3, 1995

[54] COMMUNICATION CONTROL DEVICE FOR CONTROLLING THE FLOW OF DATA BETWEEN A PLURALITY OF DEVICES

[75] Inventors: Hideaki Furukawa, Yokohama; Akimaro Yoshida, Tokyo, both of Japan

[73] Assignee: Canon Kabushiki Kaisha, Tokyo, Japan

[21] Appl. No.: 285,758

[22] Filed: Aug. 3, 1994

Related U.S. Application Data

[63] Continuation of Ser. No. 352,837, May 16, 1989, abandoned.

[30] Foreign Application Priority Data

May 16, 1988 [JP] Japan ................................ 63-118801

[51] Int. Cl.$^{6}$ .............................. H04N 1/21; H04N 1/32

[52] U.S. Cl. .......................... 358/442; 358/444; 358/468

[58] Field of Search .................................... 358/434, 442, 358/444, 468; 355/204, 208; 395/115, 325, 425

[56] References Cited

U.S. PATENT DOCUMENTS

| | | | |
|---|---|---|---|
| 4,204,251 | 5/1980 | Brudevold . | |
| 4,314,334 | 2/1982 | Daughton et al. | 355/204 |
| 4,712,908 | 12/1987 | Nakayama . | |
| 4,811,052 | 3/1989 | Yamakawa et al. . | |
| 4,876,609 | 10/1989 | Ogura | 358/434 |
| 4,947,266 | 8/1990 | Watanabe et al. | 358/498 |
| 4,980,780 | 12/1990 | Tanaka | 358/468 |
| 4,980,814 | 12/1990 | Hosaka et al. | 355/204 |
| 4,994,926 | 2/1991 | Gordon et al. | 358/434 |
| 5,075,782 | 12/1991 | Tufano et al. | 358/444 |

FOREIGN PATENT DOCUMENTS

| | | |
|---|---|---|
| 0031484 | 7/1981 | European Pat. Off. . |
| 0216484 | 4/1987 | European Pat. Off. . |
| 60-211475A | 10/1985 | Japan . |

*Primary Examiner*—Scott A. Rogers

*Attorney, Agent, or Firm*—Fitzpatrick, Cella, Harper & Scinto

[57] ABSTRACT

In a system made up of a plurality of devices such as a copier, an RDF, and a sorter, there is provided in each device a communication control device for providing communication between devices such that communication between devices can be performed independently of the device control unit inherent to that device. The communication control device includes data storage for storing device control data which can be accessed at random by a device control unit, access storage for storing access data indicating that the data storage is accessed, and a communication device for transmitting and receiving data stored in data storage. A synchronization storage device sets synchronization data indicating that the device control unit has set all the data to be transmitted in the data storage and synchronizes the device control unit and each communication control device on the basis of the synchronization data. Each communication control device further includes a protocol control device for controlling the communication device and the data storage such that any data stored in the data storage is read out and is transmitted and such that the data received by the communication device is stored at a predetermined in data storage means. In addition, the protocol control device controls the access storage device and the synchronization storage device.

16 Claims, 26 Drawing Sheets

900
UART UNIT
CH 1
RxB
TxB
BRG
CH 2
CH 3
INTR
TxD1
RxD1
RxRDY
TxD2
RxD2
LINERR
TxD3
RxD3
930
910
912
913
TIMER X
PORT
PORT 0 PORT 1
DATA BUS
ADDRESS BUS
920
DUAL PORT RAM UNIT
921
922
923
DATA BLOCK 0
DATA BLOCK 1
DATA BLOCK 2
DATA BLOCK 3
DATA BLOCK 4
DATA BLOCK 5
ACCESS FLAG AREA
COMMUNICATION REGISTER AREA
911
CPU
A.X.Y
PS.S.PC
ROM
4KByte
RAM
128Byte
940
BUS INTERFACE
TIMING CONTROL
A0~A7
D0~D7
RD
WR
CS
RESET
Xin
Xout
CNVss

| DATA BLOCK No. | ALLOCATED STATE | |
|---|---|---|
| | 3 CHANNEL MODE | 1 CHANNEL MODE |
| 0 | ch1 Tx DATA BLOCK | Tx DATA BLOCK (96 BYTES) |
| 1 | ch1 Rx DATA BLOCK | |
| 2 | ch2 Tx DATA BLOCK | |
| 3 | ch2 Rx DATA BLOCK | Rx DATA BLOCK (96 BYTES) |
| 4 | ch3 Tx DATA BLOCK | |
| 5 | ch3 Rx DATA BLOCK | |

FIG. 12

| IPCMn | DATA LENGTH | PARITY | STOP |
|---|---|---|---|
| 0 0 | 7 | NON | 1 |
| 0 1 | 8 | NON | 1 |
| 0 2 | 7 | ODD | 1 |
| 0 3 | 8 | ODD | 1 |
| 0 4 | 7 | NON | 1 |
| 0 5 | 8 | NON | 1 |
| 0 6 | 7 | EVEN | 1 |
| 0 7 | 8 | EVEN | 1 |
| 0 8 | 7 | NON | 2 |
| 0 9 | 8 | NON | 2 |
| 0 A | 7 | ODD | 2 |
| 0 B | 8 | ODD | 2 |
| 0 C | 7 | NON | 2 |
| 0 D | 8 | NON | 2 |
| 0 E | 7 | EVEN | 2 |
| 0 F | 8 | EVEN | 2 |

FIG. 13

| IPCMn | BAUP RATE |
|---|---|
| 0 0 | 75 |
| 0 1 | 110 |
| 0 2 | 150 |
| 0 3 | 300 |
| 0 4 | 600 |
| 0 5 | 1200 |
| 0 6 | 2400 |
| 0 7 | 4800 |
| 0 8 | 9600 |
| 0 9 | 12.0k |
| 0 A | 24.0k |
| 0 B | 26.1k |
| 0 C | 48.0k |
| 0 D | 96.0k |
| 0 E | 96.0k |
| 0 F | 96.0k |

FIG. 14

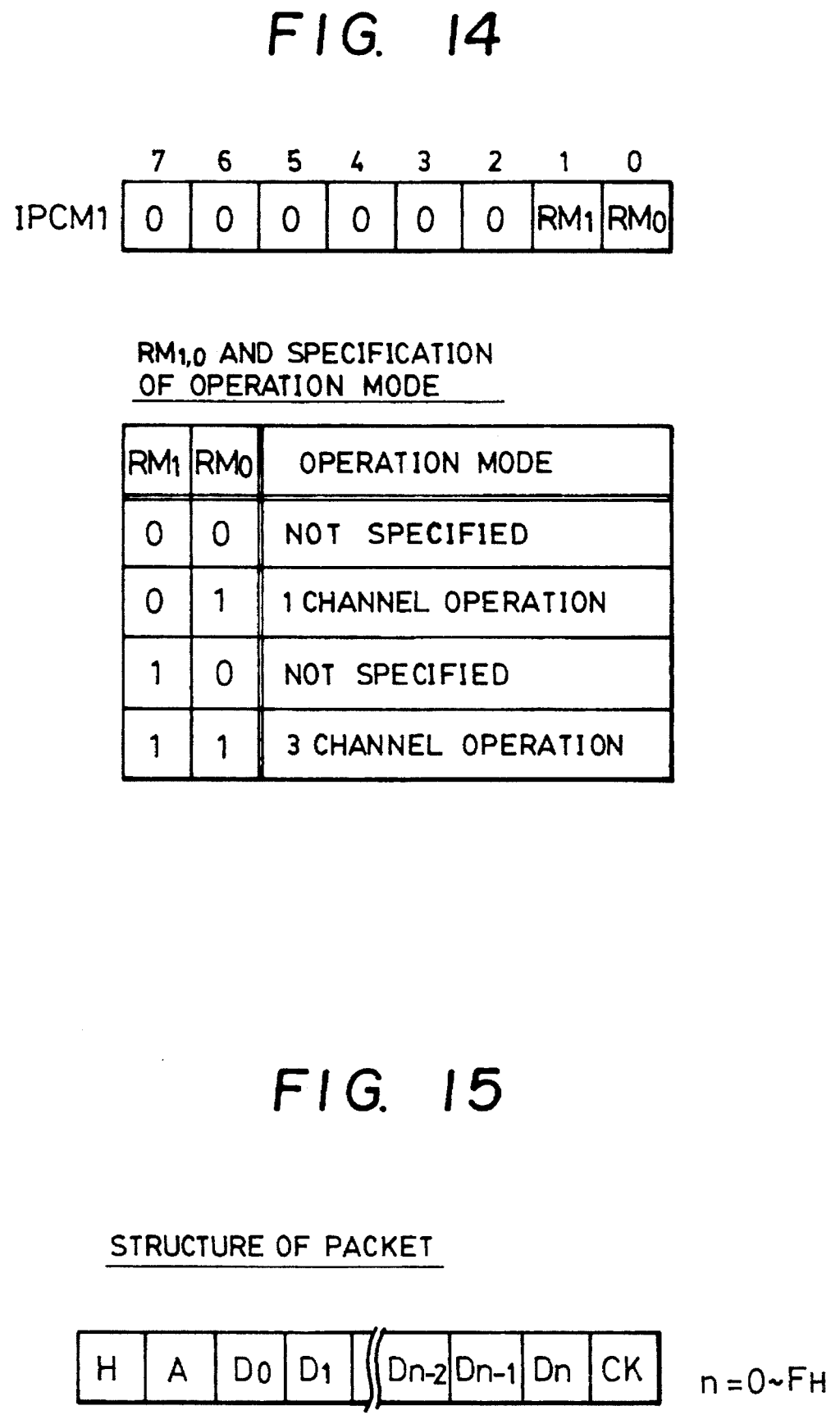

| | 7 | 6 | 5 | 4 | 3 | 2 | 1 | 0 |
|---|---|---|---|---|---|---|---|---|
| IPCM1 | 0 | 0 | 0 | 0 | 0 | 0 | $RM_1$ | $RM_0$ |

$RM_{1,0}$ AND SPECIFICATION OF OPERATION MODE

| $RM_1$ | $RM_0$ | OPERATION MODE |
|---|---|---|
| 0 | 0 | NOT SPECIFIED |
| 0 | 1 | 1 CHANNEL OPERATION |
| 1 | 0 | NOT SPECIFIED |
| 1 | 1 | 3 CHANNEL OPERATION |

FIG. 15

STRUCTURE OF PACKET

| | | | | | | | | |
|---|---|---|---|---|---|---|---|---|
| H | A | $D_0$ | $D_1$ | ... | $D_{n-2}$ | $D_{n-1}$ | $D_n$ | CK |

$n = 0 \sim F_H$

| | CONTROL CODE | | | | MEANING |
|---|---|---|---|---|---|
| | B7 | B6 | B5 | B4 | |
| $P_E$ | 0 | 0 | 0 | 0 | FINAL PACKET |
| $P_R$ | 0 | 0 | 1 | 0 | RESEND REQUEST PACKET |
| $P_S$ | 0 | 1 | 1 | 0 | INITIAL COMMUNICATION REQUEST CODE |
| P | 1 | 0 | 0 | 0 | CONTINUATION PACKET |
| $P_i$ | 1 | 0 | 1 | 0 | IDLING PACKET |
| $P_C$ | 1 | 1 | 0 | 0 | CANCEL CODE (RESPONSE TO $P_R$) |

OCCURRENCE OF COMMUNICATION ERROR AND RECOVERY (TRANSMISSION)

(RECEIPT 2)

COMMUNICATION CONTROL DEVICE FOR CONTROLLING THE FLOW OF DATA BETWEEN A PLURALITY OF DEVICES

This application is a continuation of application Ser. No. 07/352,837 filed May 16, 1989, now abandoned.

BACKGROUND OF THE INVENTION

1. Field of the Invention

The present invention relates to a communication control device for exchanging data between a plurality of devices by a communication link.

2. Description of the Related Art

A system made up of a copier and additional devices in which data is exchanged between a plurality of devices by a communication link is known. In such a copier system comprising a copier and additional devices such as a recirculation document feeder (RDF) and a sorter, the control inherent to the copier and the additional devices is performed by corresponding control units, the control units of the individual devices being connected by means of serial communication or the like.

In the conventional copier system which performs a sequence of copying operations including exchange of originals, copying, sorting of copy sheets and so on, system control is performed between the copier and the additional devices such as a RDF and a sorter by exchanging control data including an operation start command and an operation completion notice by means of serial communication.

Such serial communication is performed through a serial port of a 1-chip microcomputer (e.g., μPD87AD manufactured by Nippon Electric Co., Ltd. ) or a serial port of a serial control IC (which may be μPD71051 manufactured by Nippon Electric Co., Ltd.) connected to an address data bus of a microprocessor (e.g., V50 manufactured by Nippon Electric Co., Ltd. or 8086 manufactured by Intel Corporation) which is used to control the relevant device.

The serial communication control employs a 1-chip microcomputer, a buffer incorporated in the serial control IC for temporarily storing data to be transmitted, and a buffer for temporarily storing data received. The microprocessor receives data transmitted from another device and stores the data stored in the received data buffer in an internal memory. Further, when a plurality of data to be transmitted to another device are generated, the microprocessor fills the transmission buffer with data sequentially on the basis of the previously programmed communication procedures and control procedures.

The microprocessor also executes various other control tasks including the measurement of a clock pulse on which control of a motor is based and pulse control for a stepping motor.

In the conventional copier system, the same microprocessor is used to control the relevant device and the communications between the devices which are required for system control, and this raises the following problems.

(1) The communication control program must be activated at appropriate time intervals to allow the device control program for a copier or the like to be securely executed. In consequence, exchange of data in the copier system is delayed, and it takes a long time for the microprocessor to receive and confirm the response to the transmission data required to control a device. This prevents any attempts to increase the productivity of the copier system.

(2) Without performing an interrupt, the intervals at which the clock for motor control is input cannot be made shorter than the time during which the communication control program is executed. This makes highly accurate device control difficult.

SUMMARY OF THE INVENTION

In view of the above-described problems of the related art, an object of the present invention is to provide an improved communication control device.

Another object of the present invention is directed to enabling high-speed communications in a system comprised of a plurality of devices which reduces delays in the exchange of data between the devices.

Another object of the present invention is directed to providing for highly accurate system control in a system comprised of a plurality of devices.

Another object of the present invention is to provide a communication control device which is capable of reducing or preventing delay in the exchange of data between devices and ensures highly accurate device control by performing communication control independently of the control of a single device.

These and other objects of the present invention are obtained in a system comprising a plurality of devices which communicate with each other by providing each of the devices with a dedicated communication control unit. This enables communications between the devices to be performed independently of the device control inherent to the device. The communication control unit includes a data storage area which may be accessed at random, an access storage flag for indicating that the data storage area has been accessed, a communicator for transmitting and receiving data, a synchronization storage device for synchronizing a host, a remote device, and the data storage area, and a protocol control area for controlling the communicator and the data storage area such that arbitrary data stored in the data storage area is read out and transmitted, and such that data received by the communicator is stored at a predetermined area in the data storage area. The protocol control device further controls the access storage flag and the synchronization storage device. In this way, communication is performed independently of the device control inherent in each device, and highly accurate and high speed system control is ensured.

The above and other objects of the present invention will become more apparent from the following description of the preferred embodiments thereof, taken in conjunction with the accompanying drawings.

BRIEF DESCRIPTION OF THE DRAWINGS

FIG. 12 shows a relationship between UART operation modes and the parameters to be set;

FIG. 13 shows a relationship between UART baud rates and the parameters to be set;

FIG. 14 shows a relationship between the operation modes of an IPC and the parameters to be set;

FIG. 15 shows the structure of a packet;

DETAILED DESCRIPTION OF THE PREFERRED EMBODIMENT

An embodiment of the present invention will now be described below with reference to the accompanying drawings.

Figure 1:
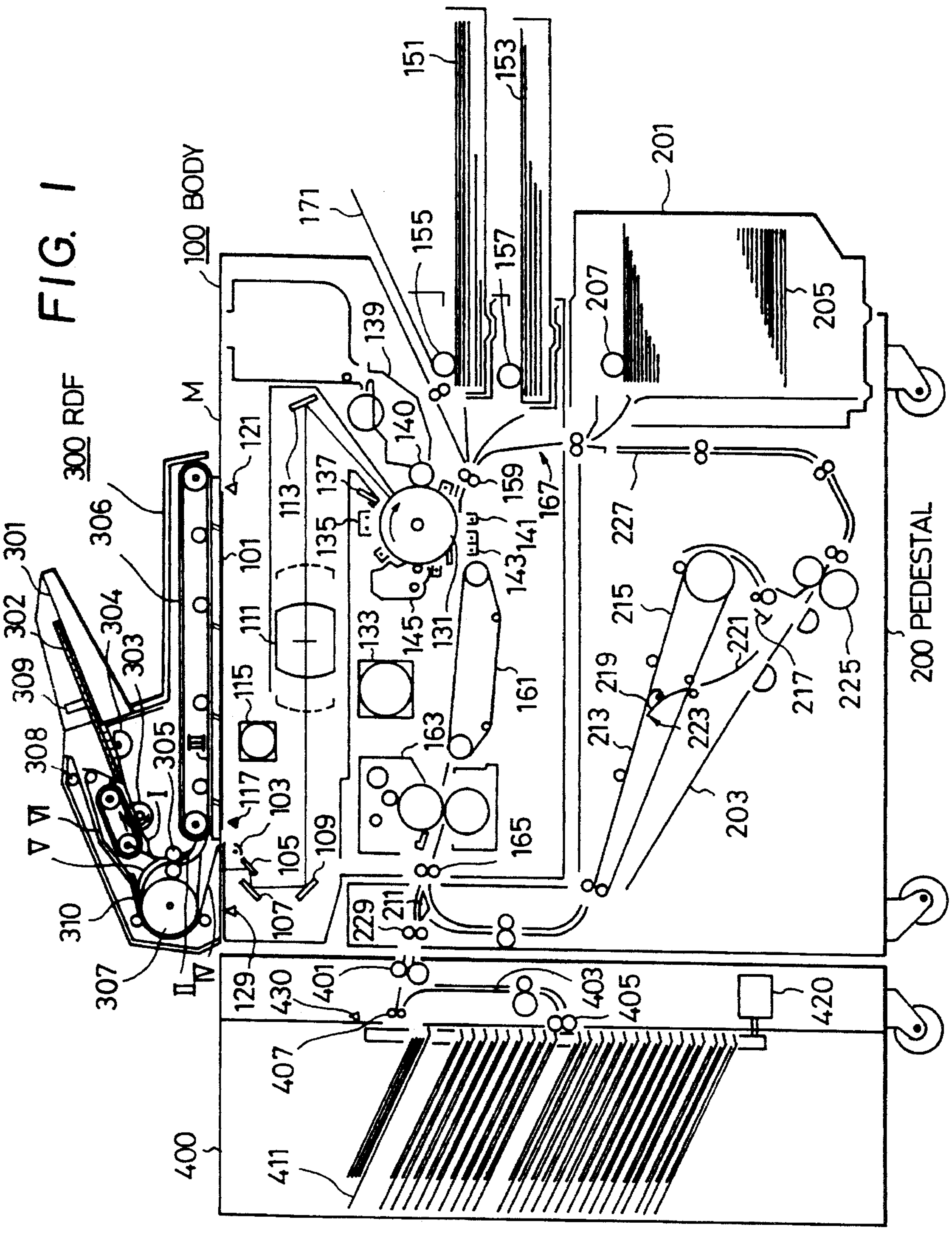
FIG. 1 is a cross-sectional view of a system to which a communication control device of the present invention can be applied.

Referring first to FIG. 1, a copier apparatus to which the present invention is applied includes a copier body 100, a pedestal 200 which has the function of two-sided processing in which a sheet of transfer paper is turned over to obtain a two-sided copy and the function of overlaying images in which recording is conducted on the same recording medium a plurality of times, a recirculating original feeding device 300 (hereinafter referred to as a RDF) for automatically feeding originals, and a sorting device 400 (hereinafter referred to as a sorter) for accommodating sheets of recorded paper into a plurality of bins, the pedestal 200, the RDF 300 and the sorter 400 being used in any desired combination.

A. Body (100)

The copier body 100 includes an original base glass 101 on which an original is placed, an illumination lamp 103 (an exposure lamp) for illuminating an original, reflecting mirrors 105, 107 and 109 (scanning mirrors) for changing the optical path of the light reflected by an original, a lens 111 having the functions of focusing and enlarging/reducing the size of an image, a fourth reflecting mirror (a scanning mirror) 113 for changing the optical path of the light, an optical system motor 115 for driving the optical system, sensors 117, 129 and 121 for detecting the position of the optical system, a photosensitive drum 131, a motor 133 for driving the photosensitive drum 131, a high-voltage unit 135, a blank exposure unit 137, a developing device 139, a developing roller 140, a transfer charger 141, a separation charger 143, and a cleaning device 145.

The copier body 100 further includes an upper stage cassette 151, a lower stage cassette 153, a manual paper supply port 171, paper feeding rollers 155 and 157, resist rollers 159, a conveyer belt 161 for conveying the recording paper on which an image is recorded to a fixing device, a fixing device 163 for fixing the image on the recording paper by means of heat and pressure, and a sensor 167 used for two-sided mode.

The surface of the photosensitive drum 131 is covered by a seamless photosensitive body composed of a photoconductive body and a conductive body. The rotatably supported photosensitive drum 131 starts rotating in the direction indicated by the arrow in FIG. 1 by the operation of the main motor 133 which operates in response to the pressing of a copy start key which is described later. After a preprocessing step in which rotation control and the potential control of the photosensitive drum 131 have been completed, an original placed on the original base glass 101 is irradiated by the illumination lamp 103 formed integrally with the first scanning mirror 105, and the light reflected by the original passes through the first scanning mirror 105, the second scanning mirror 107, the third scanning mirror 109, the lens 111, and then the fourth scanning mirror 113 and reaches the photosensitive drum 131.

The photosensitive drum 131 is corona charged by the high-voltage unit 135. Thereafter, the drum 131 is slit exposed to the light representing an image (an image of the original) formed by illuminating the original by the illumination lamp 103 so as to allow a latent image to be formed on the drum 131 by the known Carson Method.

Next, the latent image formed on the photosensitive drum 131 is developed by the developing roller 140 of the developing device 139 in order to make it a visible toner image. The visible toner image is then transferred onto a sheet of transfer paper by the transfer charger 141 in the manner described below.

The sheet of transfer paper, which is set in the upper stage cassette 151 or the lower stage cassette 153 or which is set at the manual paper feed port 171, is fed into the interior of the copier body by the paper feed roller 155 or 157. The sheet of transfer paper is then fed toward the photosensitive drum 131 by the resist rollers 159 at an appropriate timing in which the forward end of the latent image and the forward end of the sheet of paper are aligned with each other. The toner image formed on the drum 131 is transferred onto the sheet of paper by virtue of the sheet of paper being passed between the transfer charger 141 and the drum 131. After the transfer, the sheet of transfer paper is separated from the drum 131 by the separation charger 143, and is then led to the fixing device 163 by means of the conveyor belt 161, where the image is fixed onto the sheet of transfer paper by means of pressure and heat. The fixed sheet of transfer paper is discharged to the outside of the copier body 100 by the discharge rollers 165.

The drum 131 from which the image has been transferred onto the sheet of paper continues to rotate so that the surface thereof is cleaned by the cleaning device 145 comprised of a cleaning roller and an elastic blade.

B. Pedestal (200)

The pedestal 200 can be disconnected from the copier body 100. The pedestal 200 includes a deck 201 which is capable of accommodating up to 2000 sheets of transfer paper, and an intermediate tray 203 used for two-sided copying. In the deck 201, a lifter 205 rises in accordance with the amount of transfer paper so that the top of the pile of the sheets of transfer paper is kept in contact with a paper feed roller 207.

The pedestal 200 further includes a paper discharge flapper 211 for switching over the paper path between the two-sided recording/image overlaying path and the discharge path, conveying paths of a conveyer belt 213 and 215, and an intermediate tray weight 217 for pressing the transfer paper. The sheets of transfer paper which have been turned upside down by being passed through the paper discharge flapper 211 and the conveying paths 213 and 215 are accommodated in the intermediate tray 203 for two-sided copy. An image overlaying recording flapper 219 disposed between the conveying paths 213 and 215 switches over the paper path between the two-sided recording path and the image overlaying recording path. The sheets of transfer paper are led to an image overlaying recording path 221 when the flapper 219 is pivoted upward. The pedestal further includes an image overlaying recording paper discharge sensor 223 for detecting the rear end of the sheet of transfer paper that passes through the image overlaying recording flapper 219, paper feed rollers 225 for feeding the sheets of transfer paper toward the drum 131 through a path 227, and discharge rollers 229 for discharging the sheets of transfer paper to the outside of the pedestal.

For two-sided recording (two-sided copies) or image overlaying recording (image overlaid copies), the paper discharge flapper 211 of the copier body 100 is raised so that the sheets of copied transfer paper can be accommodated in the intermediate tray 203 through the conveying paths 213 and 215 and through conveying path 221, respectively. At that time, the image overlaying recording flapper 219 is lowered for two-sided recording, whereas it is raised for image overlaying recording. The intermediate tray 203 is capable of accommodating, for example, up to 99 copy sheets. The copy sheets accommodated in the intermediate tray 203 are pressed by the intermediate tray weight 217.

For the rear side recording or image overlaying recording, the copy sheets accommodated in the intermediate tray 203 are fed toward the resist rollers 159 of the copier body 100 through the path 227 one by one from the lowermost one by the action of the paper feed rollers 225 and the weight 217.

C. RDF (Recirculating Original Feeding Device)(300)

In the RDF 300, a bundle of originals 302 are set in a tray 301. In a case of single-sided originals, a semicircular roller 304 and a separation roller 303 separate the lowermost original one by one. The separated original is fed by conveyor rollers 305 and a belt 306 to an exposure position on the platen glass 101 through paths I and II. After the original has stopped at the exposure position, a copying operation is started. Thereafter, the original is fed to a path VI through a path IV by a conveyor large roller 307 and is then returned on the top of the original bundle 302 by paper discharge rollers 308. A recycle lever 309 detects the cycle of the originals. The recycle lever 309 is placed on top of the original bundle when the original feed is started. One cycle of the originals is detected when the recycle lever drops by its own weight as the final original passes from it.

In a case of two-sided originals, the original which is once fed to the paths III and IV through the paths I and II is led to a path V by switching over a switch-over flapper 310, is passed through the path II by the conveyor rollers 305, and is then conveyed onto the platen glass 101 by the belt 306. That is, the conveyor large roller 307 turns over the originals by causing them to pass through the Paths III, IV, V and II.

Further, the number of originals can be counted with the recycle lever 309 by conveying the bundle of originals 302 one by one through the paths I, II, III, IV, V1 until all the originals have been fed out.

D. Sorter

The sorter 400 has a tray with 25 bins 411. It has the function of piling or sorting the sheets of recorded paper. There are three sorter operation modes, a non-sorting mode, a sorting mode and a collation mode. The sorter 400 operates in the operation mode selected before a copy start key 605 of a display/operation unit 600 of the copier 100 is pressed (all of which are described below).

1. Non-Sorting Mode

In the non-sorting mode, the bin shifting motor 420 does not operate after sorting has started, hence the bins do not shift. As a result, the copy sheets are sequentially discharged by the paper discharge rollers 229 of the copier body and the non-sorting paper discharge rollers 407 into the top tray. An accommodation display 430 is provided at the non-sorting paper discharge port.

2. Sorting Mode

In the sorting mode, if the uppermost bin is located above the sorting paper discharge rollers 405, the bin-moving motor 420 is operated to move the uppermost bin below the sorting paper discharge rollers 405, the uppermost bin being then stopped at that position (which is the home sorting position). The copy sheets are discharged sequentially by the paper discharge rollers 229 of the copier body 100, conveyor rollers 401 of the sorter 400 and directed downward by an unshown director through discharge path 403 toward paper discharge rollers 405 and into the individual bins 411. Each time a sheet of paper is discharged into the bin, the bins are raised or lowered by the bin-shifting motor 420 so that a subsequent bin is aligned with the discharge rollers 405.

3. Collating Mode

In collation mode, the bin-moving motor 420 is operated first to move the bins to their home sorting position, as in sorting mode. The copy sheets are sequentially discharged into the individual bins 411 by the paper discharge rollers 229 of the copier body, the conveyor rollers 401 of the sorter and the discharge rollers 405 through the path 403. Each time a different original is input, the bins are raised or lowered by the bin-shifting motor 420.

Figure 2A:
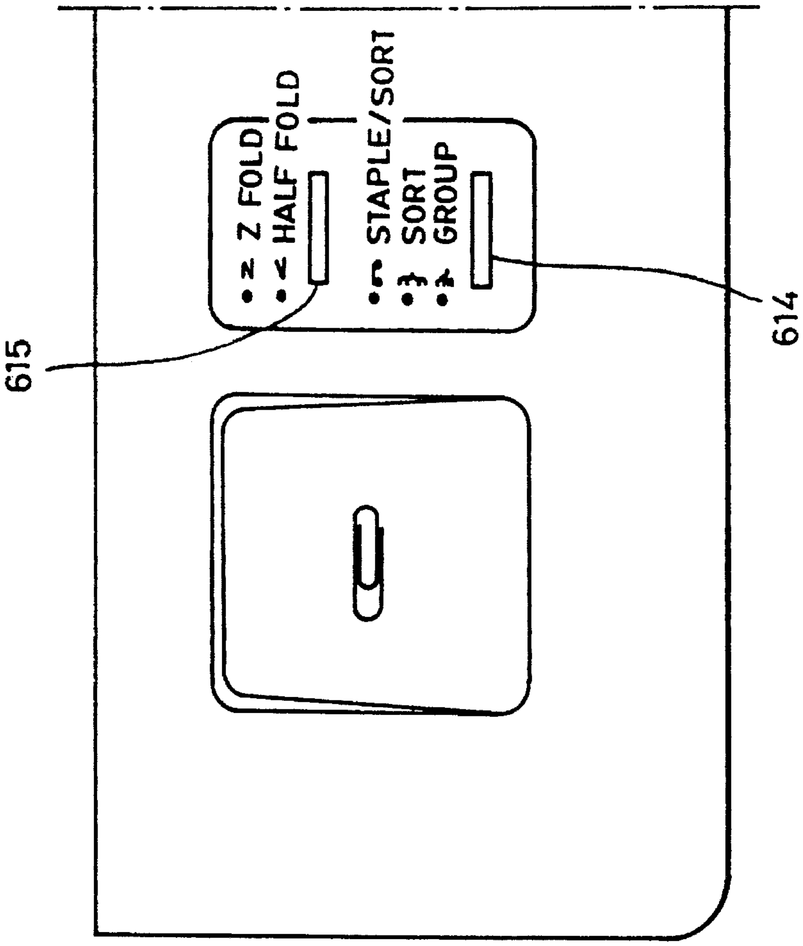
FIGS. 2A, 2B and 2C, is a front view of an operating portion of the system of FIG. 1.
Figure 2:
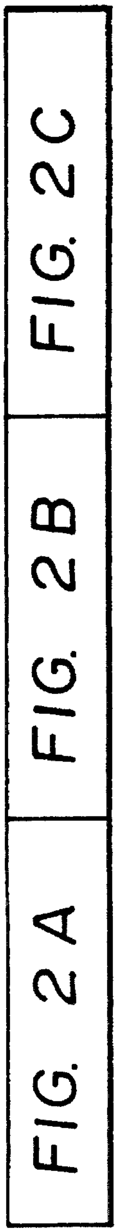
FIG. 2, comprising
Figure 2B:
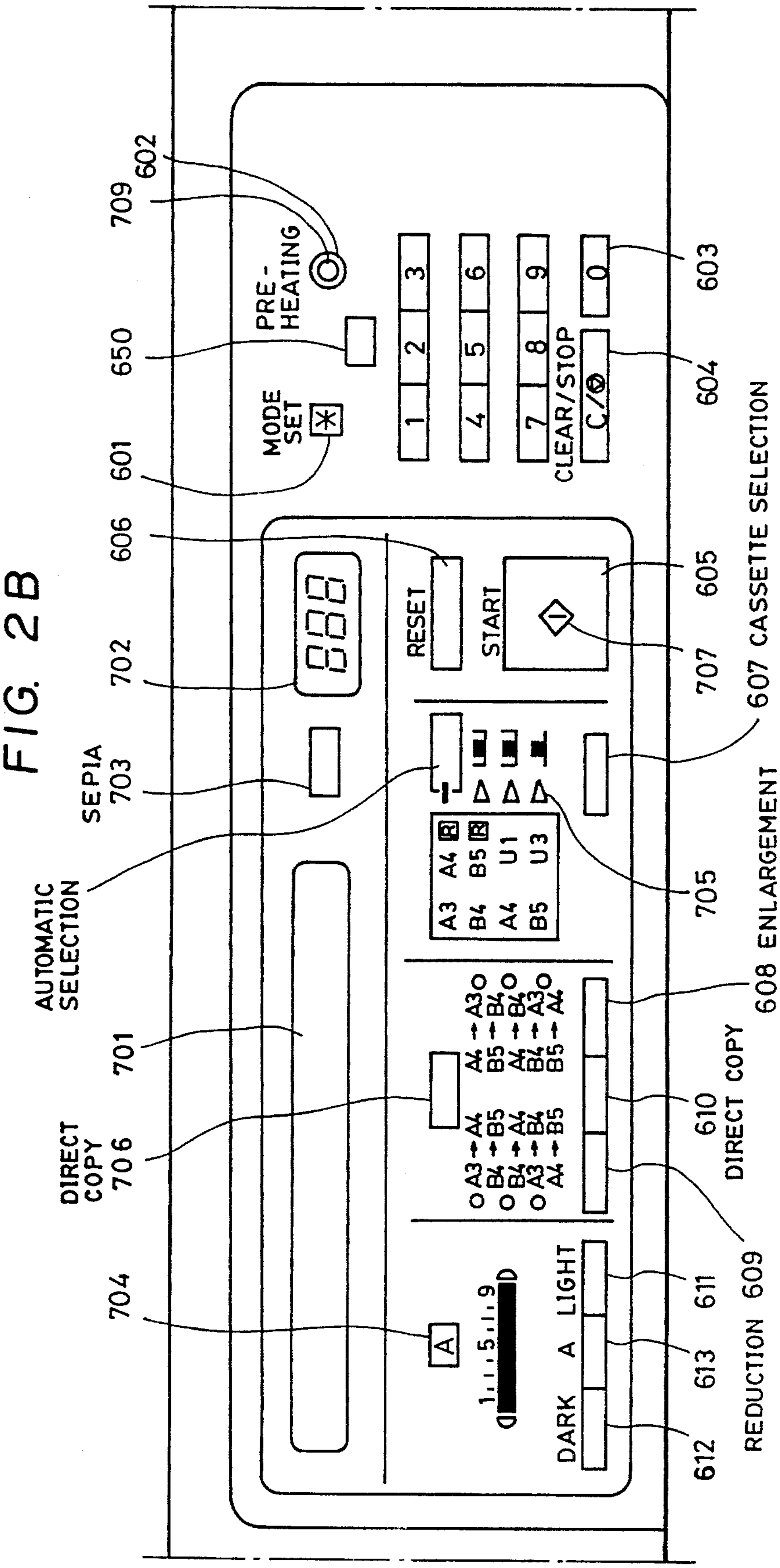
Figure 2C:
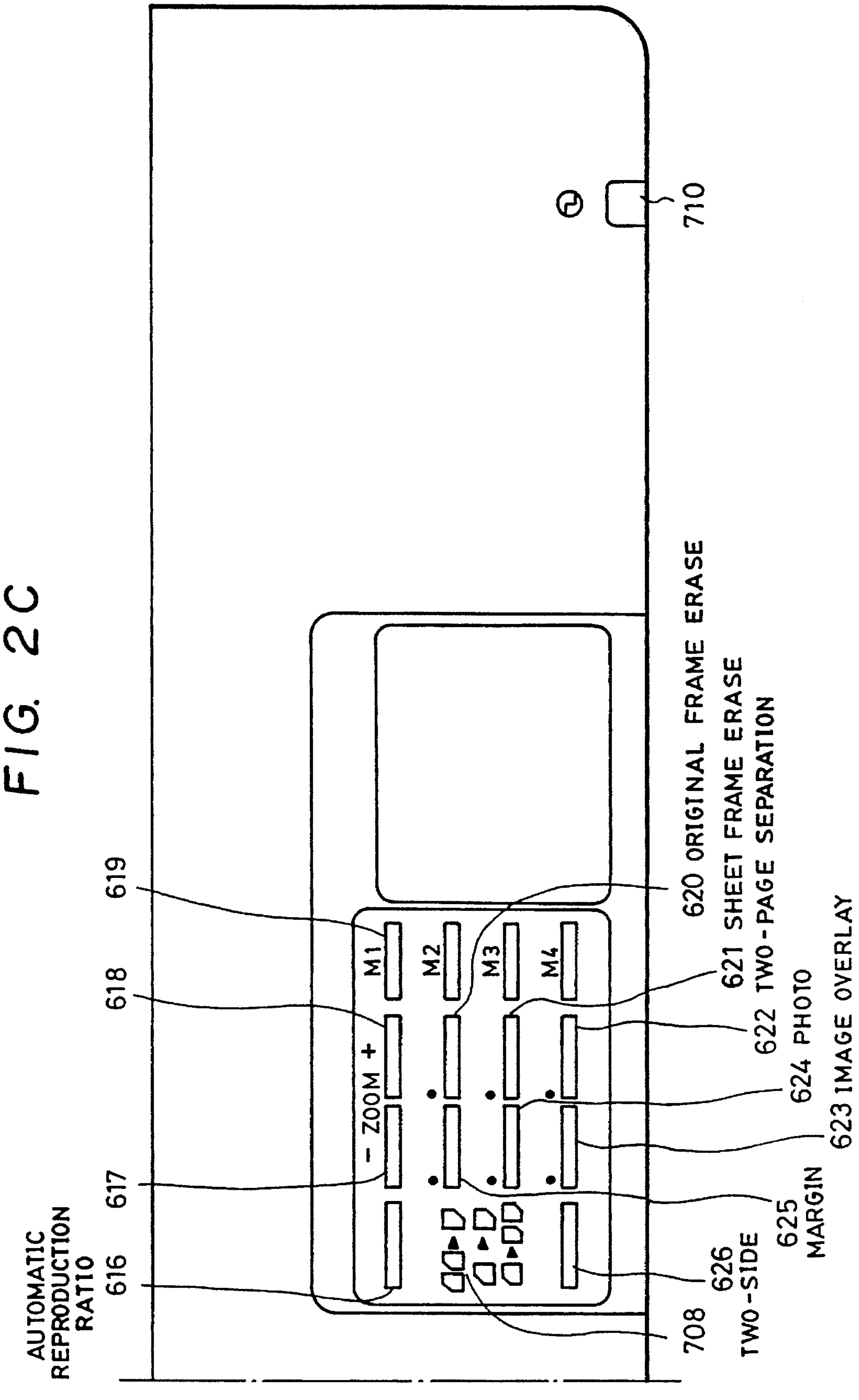

FIG. 2 shows the layout of an operation panel provided on the copier body 100. The operation panel has a group of keys 600 and a group of displays 700 which are described below.

E. Group of Keys (600)

A reference numeral 601 denotes an asterisk (*) key which is pressed when an operator (a user) sets the amount of binding margin or a size used to erase an original frame. 606 designates a standard operation key which is pressed in order to return the operation mode to a standard mode. 602 denotes a standby mode key, which is pressed in order to render the copier body 100 to a preheated state or to reset the preheated state. The key 602 is also pressed when the operation mode is returned to a standard mode from an automatic shut-off state.

A reference numeral 605 designates a copy start key which is pressed when copying operation is started.

604 denotes a clear/stop key which serves as a clear key during stand-by and as a stop key during the copying. The pressing of the clear key resets the copy number set. It also resets the * (asterisk) mode. The stop key is pressed to interrupt continuous copying. The copying operation stops after an ongoing copying operation has been completed.

603 denotes an input keyboard which is used to set the copy number or the * (asterisk) mode. 619 denotes copy mode memory keys which are used in order to register the modes most frequently used. Four different types of mode can be registered using the copy mode memory keys M1 to M4.

Reference numerals 611 and 612 denote manual density control keys which are pressed when the copying density is manually adjusted. 613 denotes an automatic density control key which is pressed when the copying density is automatically adjusted in accordance with the density of an original or when the AE (automatic exposure or density control) is reset and is switched over to manual control. 607 denotes a cassette selection key which is pressed for selection of the upper stage cassette 151, the intermediate stage cassette 153 or the lower paper deck 201. When originals are set in the RDF 300, the APS (automatic paper cassette selection) mode can be selected by pressing the key 607, which means that a cassette containing the sheets of transfer paper having the same size as that of an original can be automatically selected.

610 denotes a direct copy key which is pressed when a life-size copy is to be obtained. 616 denotes an automatic reproduction ratio key which is pressed in order to automatically reduce or enlarge the image of an original in correspondence with the size of the designated sheets of transfer paper. 617 and 618 denote variable reproduction ratio keys which are pressed when an arbitrary magnification of between 64% and 142% is specified. 608 and 609 denote reduction and enlargement keys, which are pressed in order to specify the reduction or enlargement between the standard sizes.

A reference numeral 626 denotes a two-sided mode key which is pressed in order to obtain a two-sided copy from a single-sided original, a two-sided copy from a two-sided original or a single-sided copy from a two-sided original. 625 denotes a margin mode key which is used to obtain a copy with a binding margin having a predetermined length at the left side of a sheet of transfer paper. 624 designates a photo copy which is pressed when a photograph is used as an original to be copied. 623 denotes an image overlay key which is pressed when images of two originals are formed (synthesized) on the same side of the sheet of transfer paper.

620 denotes an original frame erasing mode key, which is pressed when a user erases the frame of a standard-size original. At that time, the size of the original is set using the asterisk key 601.

621 denotes a sheet frame erasing mode key. This is pressed when a user erases the frame of an original in accordance with the size of a cassette.

622 denotes a two-page separation mode key, which is pressed when the right and left pages of an original are to be copied on separate sheets of paper.

614 is a paper discharge method selection (sort/group/staple) key. In a case where a stapler for binding the copy sheets is connected, either a staple mode or a sorting mode can be selected or reset by pressing the sort/group/staple key 614. In a case where the sorting tray (the sorter) is connected, either a sorting mode or a group mode can be selected or reset.

615 denotes a fold key which is pressed when either a Z-shaped fold or a half fold is selected or reset. In the Z-shaped fold mode, a copy sheet having an A3 or A4 size is folded so that it has a Z-shaped cross-section. In the half fold mode, a copy sheet having an A3 or A4 size is folded in two.

650 denotes a key which is pressed to select either a first mode in which the bins are moved to their initially set position (a home sorting position) before accommodation of the sheets is started or a second mode in which bin movement is not performed.

F. Group of Displays (700)

In FIG. 2, a reference numeral 701 denotes an LCD (liquid crystal) type message display which displays information on copying using characters each of which is composed of 5×7 dots, e.g., a 40-character textual message or a copy reproduction ratio set by the reduction and enlargement keys 608 and 609, the direct copy key 610 and the variable reproduction ratio keys 617 and 618. The display 701 employs a semitransmission type liquid crystal and two colors for back lights, normally the back light of green being lighted whereas the back light of orange being used for abnormal messages or in a copy disabled state.

A reference numeral 706 denotes a direct copy display which lights up when a direct copy is selected. 703 designates a color developing unit select display which lights up when a sepia developing unit is set. 702 denotes a copy number display which displays a copy number or a self-diagnosis code. 705 denotes a cassette display which displays whether the upper stage cassette 151, the intermediate stage cassette 153 or the lower deck 201 is selected.

704 denotes an AE display, which lights up when AE (automatic density control) is selected by pressing the AE key 613. 709 denotes a standby mode display which lights up in the preheated state. The display 709 blinks in the automatic shut-off state. 707 denotes a ready/wait display which employs a two-color LED. The display 707 lights up in green in the ready state (a state where copying is possible) and in orange in the wait stage (a state where copying is impossible).

708 designates a two-sided mode display which lights up when either a two-sided copy from a two-sided original or a two-sided copy from a single-sided original is selected.

In a standard operation mode with the RDF 300 attached to the copier body, the copy number is set to 1, and the automatic density control mode, automatic paper selection, direct copy, and the single-sided copy from a single-sided original are respectively selected. In a standard mode without the RDF 300, the copy number is set to 1, and manual density control mode, the direct copy, and the single-sided copy from a single-sided original are respectively selected. Use or non-use of the RDF 300 is determined by whether or not originals are set in the RDF 300.

710 denotes a power lamp which lights up when a power switch is turned on.

G. Control Device (800)

Figure 3A:
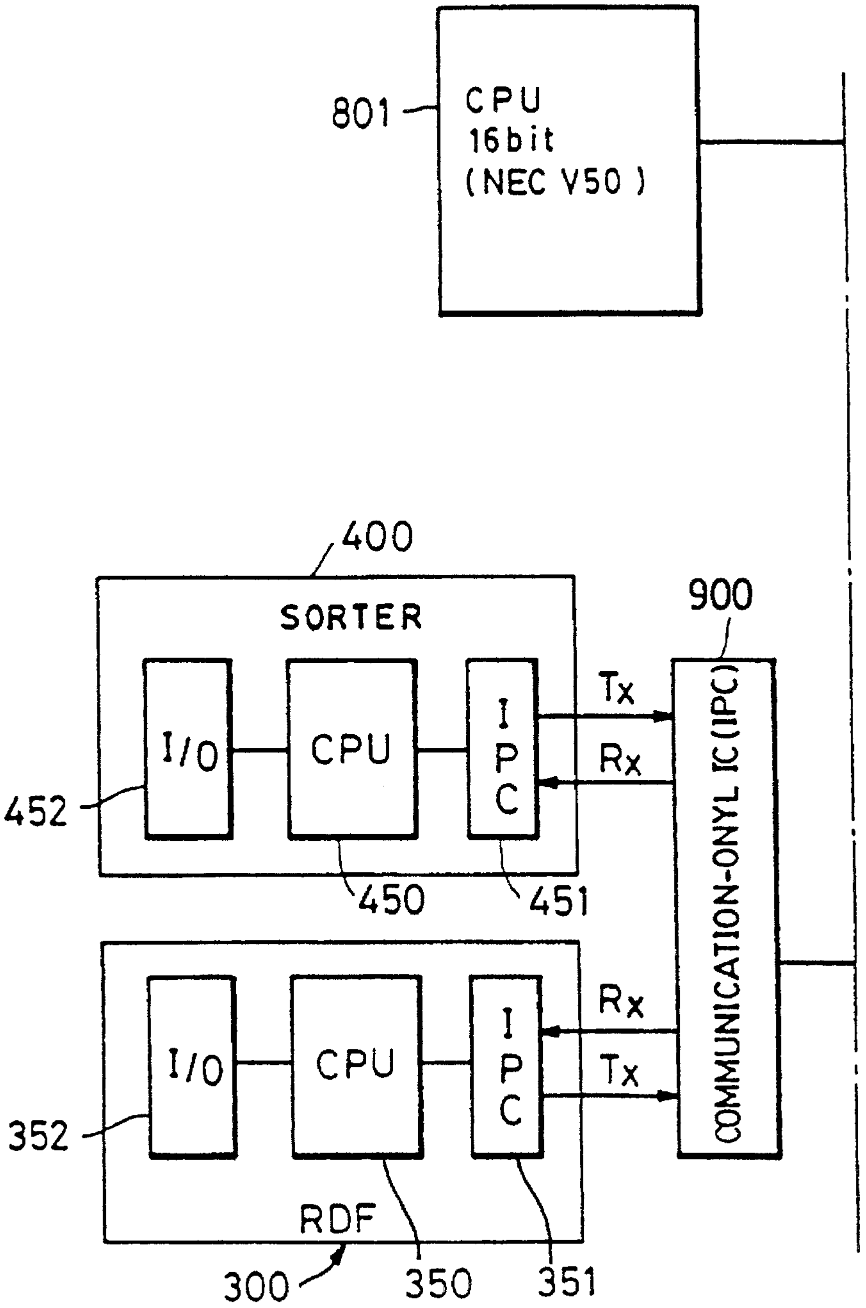
FIGS. 3A and 3B, is a circuit diagram of a control device of the system of FIG. 1.
Figure 3:
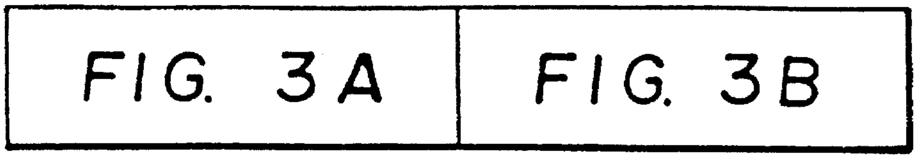
FIG. 3, comprising
Figure 3B:
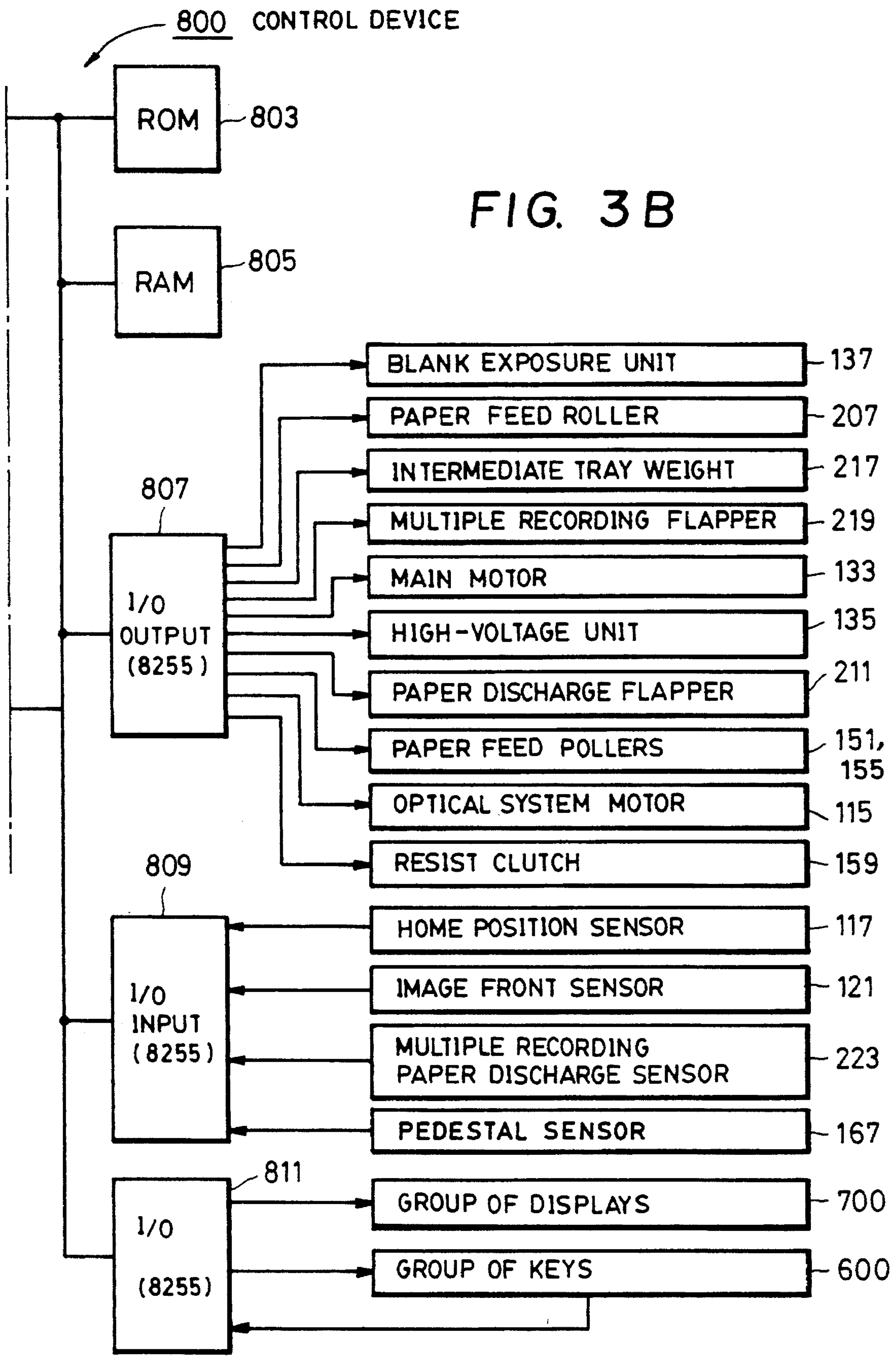

FIG. 3, comprising FIGS. 3A and 3B, is a circuit diagram of a control device 800 of the copier apparatus of FIG. 1. The control device 800 includes a central processing unit (CPU) 801 for performing operations required to carry out the present invention. The CPU 801 may be a microcomputer V50 manufactured by NEC (Nippon Electric Co, Ltd.). The control device 800 also includes a read-only memory (ROM) 803 for storing control procedures (a control program). The CPU 801 controls the components connected through a bus on the basis of the control procedures stored in the ROM 803. A random-access memory (RAM) 805 is a main memory used to store input data or as a memory area for operation.

The control device 800 further includes an interface (I/O) 807 for outputting a control signal of the CPU 801 to a load such as a main motor 133, an interface 809 for sending a signal input from an image front sensor 131 or the like to the CPU 801, and an interface 811 for I/O controlling the group of keys 600 and the group of displays 700. The interfaces 807, 809 and 811 may be an I/O circuit port μPD8255 manufactured by NEC.

The group of displays 700 represents the indicators shown in FIG. 2 which use LEDs and LCDs, and the group of keys 600 represents the keys shown in FIG. 2. The CPU 801 is capable of acknowledging which key is pressed by means of a known key matrix.

An IC 900 exclusively used for communications is composed of a dual port RAM 920 shown in FIG, 5, a universal asynchronous receiver/transmitter (UART) unit 930 which is capable of communicating with a plurality of other devices, a control unit 910, and so on.

The control unit 910 of the IC 900 has the function of transmitting the data stored in the dual port RAM 920 which has been modified by the CPU 801 through the UART unit 930 and of receiving data through the UART unit 930 and storing the received data on the dual port RAM after data processing, e.g., error checking, it.

The RDF 300 and the sorter 400 respectively incorporate ICs 351 and 451 having the same function as that of the IC 900, the detail being described later.

The dual port RAM 920 in the IC 900 stores the newest condition data on the operation status of the sorter 400 and the RDF 300 which has been transmitted therefrom. The CPU 801 is capable of grasping the controlled state of the sorter and the RDF by accessing the RAM.

The control data set in the dual port RAM 920 by the CPU 801 to control the sorter or the RDF is transmitted to the IC 451 or 351 in the sorter 400 or the RDF 300 through the UART unit 930 and a TX line. The 1-chip microcomputer 450 or 350 (e.g., a μPD87AD manufactured by NEC) with a control program incorporated therein obtains access to the control data transmitted and stored in the dual port RAM in the IC 451 or 351, and starts the control operation represented by the control data.

An IC 900 exclusively used for communications (hereinafter referred to as an IPC: Intelligent Protocol Controller) is an intelligent communication control IC in which a CPU, a ROM, a RAM, 3-channel asynchronous serial interface, a BUS interface are fabricated on one chip. The IPC 900 has the function of automatically transmitting data on the RAM and of setting the received data on the RAM.

Figure 5:
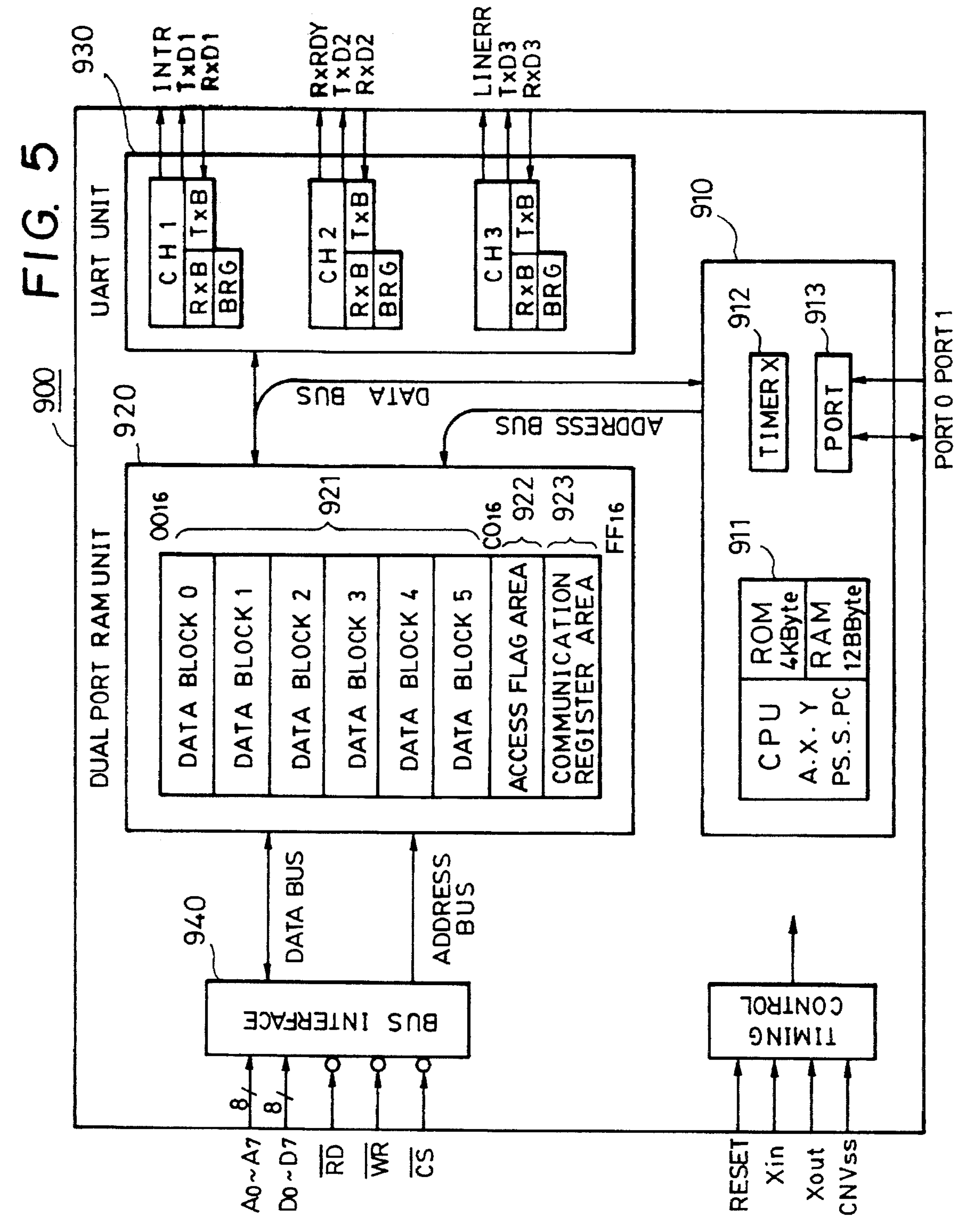
FIG. 5 is a block diagram of an (Intelligent Protocol Controller (IPC), showing an internal configuration thereof.

As shown in FIG. 5, the IPC 900 includes a control unit 910 for controlling the IPC internally, a dual port RAM unit 920, a UART (Universal Asynchronous Receiver/Transmitter) unit 930 for performing a communication control, and a BUS interface unit 940 used to connect the IPC with an external (host) device.

910: (Control Unit)

The control unit is composed of a single chip CPU 911 with a ROM and a RAM incorporated therein, a timer X 912 for performing timing control, and a port 913 for an external memory.

920: (Dual Port RAM Unit)

The dual port RAM unit is divided into a data block area 921, an access flag area 922, and a communication register area 923.

The data block area 921 is a RAM area which stores the Tx data and Rx data for individual channels which are described later. The data block area 921 is used in a block of 32 bytes.

Each of the blocks is capable of receiving two concurrent access requests (for read and write operations) from an external device (a host computer) and an internal (local) device. However, in the case where the same memory cell (the same byte) is accessed concurrently by the external device and the local device, if one operation is a write operation, the contents to be read from that memory cell becomes undefined.

Figures 6, 7:
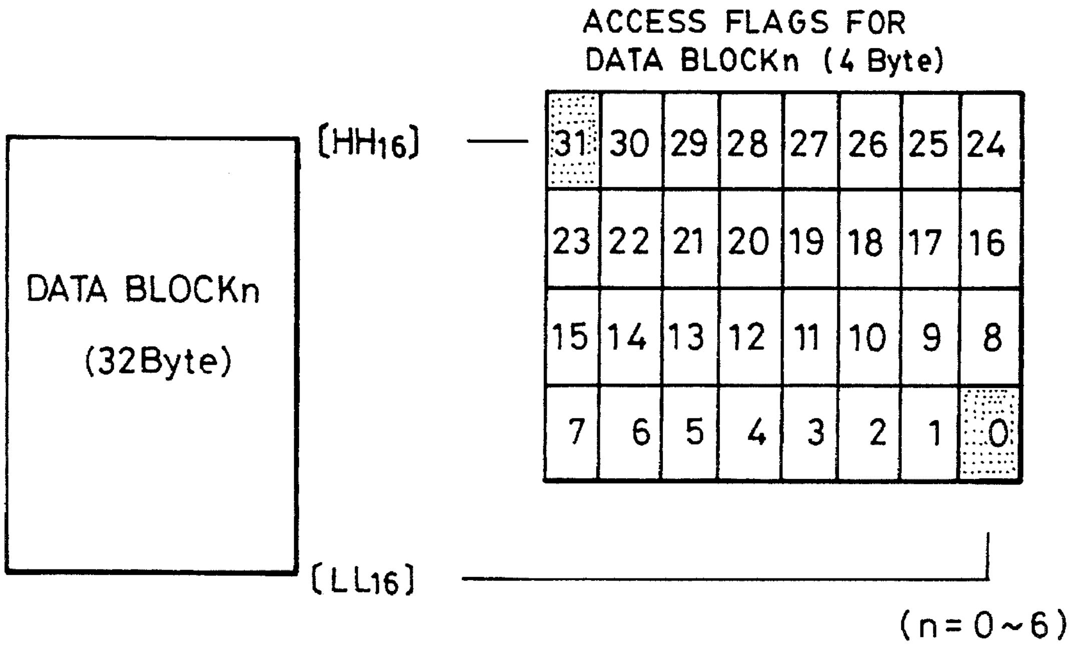
FIG. 6 shows the allocation of a data block area in a dual port RAM of an IPC.
FIG. 7 shows the concept of access flags of an IPC.

The data blocks are allocated to the respective channels in 3-channel mode and 1-channel mode, as shown in FIG. 6.

The access flag area 922 is composed of access flags whose bits are prepared in correspondence with the memory addresses of the data block. The bits of the access flags are allocated with the lowermost bit thereof corresponding to the lowermost address in the data block and with the second lowermost bit corresponding to the second lowermost address in the data block and so on.

"0" is set in the access flag when the corresponding memory address is read, while "1" is set in the access flag when the corresponding memory address is accessed for write operation.

The access flags are read in a block of 8 bits. Since this access flag area is a read-only area, the contents of the access flags do not change when the space of this area is accessed.

FIG. 7 shows the concept of the access flag area.

Figure 8:
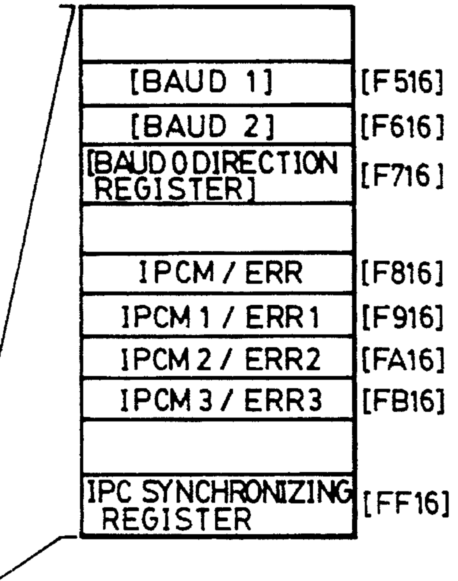
FIG. 8 shows the layout of a communication register area within the dual port RAM of an IPC.

The communication register area 923 is composed of an IPC mode setting register, an IPC error register, and an IPC synchronizing register. Both the IPC mode setting register and the IPC error register employ 4 bytes of the same address on a system bus. However, the former register is used exclusively for write operation when an IPC mode is set (i.e., when UART mode, UART baud rate and operation mode are set), whereas the latter is exclusively used for read operation when an error occurring in the IPC (an error channel or the type of error) is to be determined, the details thereof being described later (see FIG. 8).

Figure 10:
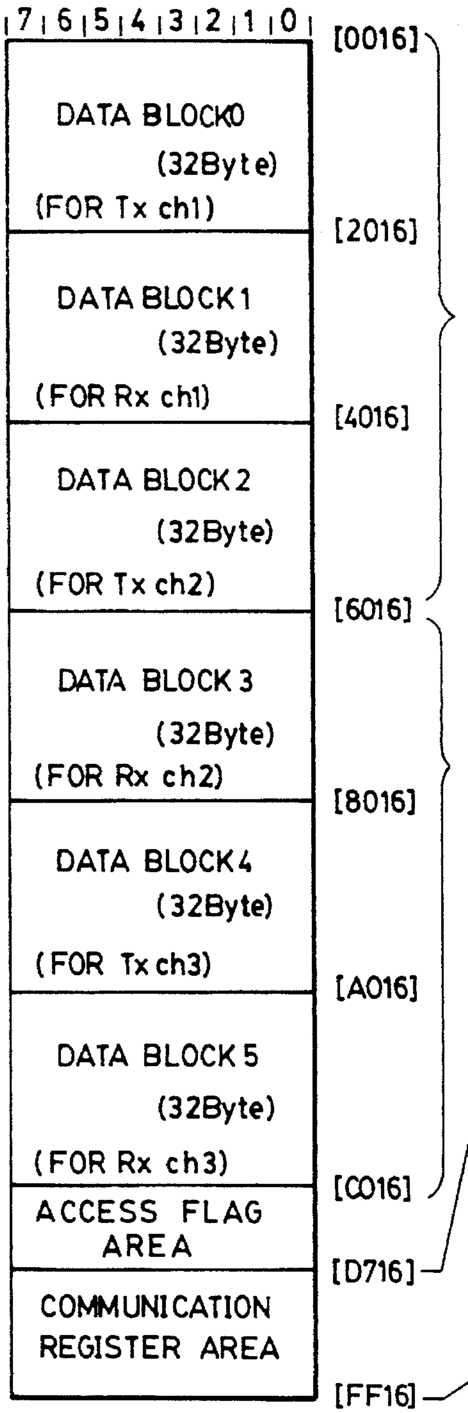
FIG. 10 shows the structure of a dual port RAM of an IPC.
Figure 9:
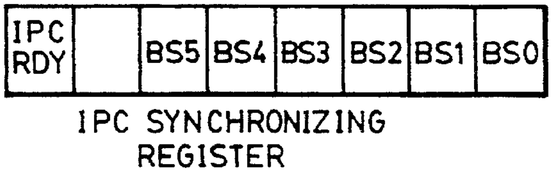
FIG. 9 shows the structure of an IPC synchronizing register.

The IPC synchronizing register is used for a handshake between the host CPU with a local CPU. The IPC synchronizing register is composed of 6-bit block semaphore flags (BS0 to 5) and a 1-bit ready flag (IPC—RDY). BS0 to 5 are associated with the transmission and receipt operations of a UART unit, BS0, 2, 4 representing the semaphore flags used for transmission control of the UART unit. The transmission of the UART unit starts when "1" is set in BS0, 2, 4. "0" is set in BS0, 2, 4 by the corresponding local CPU after the transmission has been completed. BS1, 3, 5 are the semaphore flags used only for receipt control of the UART unit. "1" is set in BS1, 3, 5 by the local CPU each time receipt is completed in the UART unit. (see FIG. 9). The memory mapping of the entire dual port RAM unit 920 is shown in FIG. 10.

930: (UART unit)

The UART unit incorporates a UART with three channels. The individual channels have an equivalent function. The UART unit also incorporates three baud rate generators. These enable the channels to be operated completely independently from each other. Each of the channels has three external terminals including TxD (transmission output), RxD (receipt input) and a control output, an internal register TxB (a transmission buffer register), RxB (a receipt buffer register), STATUS (a status register), MODE (a mode register) , CONTROL (a control register), and BAUDRATE (a baud rate generator). In addition, a CLK terminal (baud rate external clock input) is used in common by three channels.

The control output represents INTR for channel 1, RxRDY for channel 2, and LINEERR for channel 3. When a UART error occurs, INTR outputs a request of interrupt. At this time, a channel on which an error is occurring and the type of the error can be noted by reading the error register (ERR, ERR1, ERR2, ERR3) in the communication register area.

Figure 11:
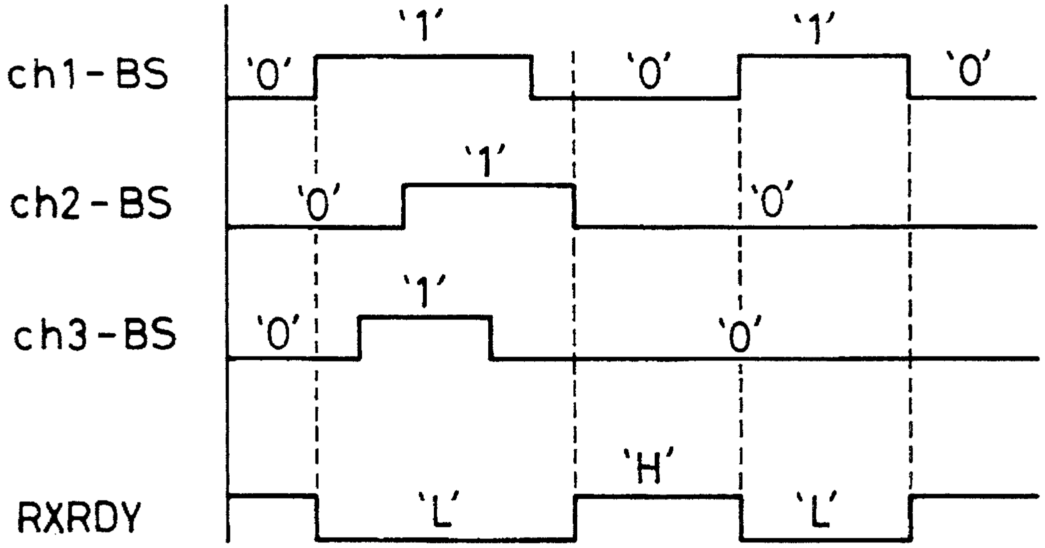
FIG. 11 is a timing chart, showing a relationship between RxRDY and block semaphores.

As shown in FIG. 11, RxRDY outputs "L" concurrently with the setting of BS for the receipt data block which is conducted after the receipt of a packet has been completed. When "0" is set in the BSs of the receipt blocks of all the channels, RxRDY returns to "H".

LINEERR outputs pulses having a duration of about 6 μs when a communication line error (a parity error or a framing error) occurs on either of channel 1, 2 and 3.

When data is communicated between the host CPU and the IC 900, the host CPU sets the control line CS to "1". When the host CPU writes the data into the IC 900, it sets the control line WR to "1" and when the host CPU reads out the data from the IC 900, it sets the control line RD to "1".

940: (BUS Interface)

The BUS interface that connects the host CPU and the IPC is composed of (1) 8 address lines, (2) 8 data lines, and (3) 3 lines of CS, WR and RD controls.

Next, the systems software of an IPC will be described.

The software involves the internal control of the IPC, the packet communication by means of a UART, and the exchange of information and the synchronization between the IPC and a host CPU.

In the communication with other IPC which is performed through a UART, the IPC has the function of recovering errors and initialization so that only correct data is stored in the dual port RAM, the stored data being then handed over to the host CPU.

(Power On Reset)

After power on, the various ports, the timer and the registers are initialized. Thereafter, the host CPU sets the modes, and then activates the UART for communication.

(Setting of Mode)

There are three types of modes, as follows.

1. Specification of UART Mode

Setting the parameters of IPCM1, 2, 3 enable the data length, parity and stop bit to be determined. A relationship between the parameters and the modes is shown in FIG. 12.

2. Specification of UART Baud Rate

Baud rate is determined by setting the parameter of the IPCM1, 2, and 3. A relationship between the parameters and the baud rates is shown in FIG. 13 (in the case where the system clock is 9.216 Mz).

3. Specification of IPC operation mode

As IPC operation mode command is set in an IPCM, the operation mode is set using the parameter set in IPCM1, and all the data blocks are thereby cleared to "00H". FIG. 14 shows the values of the parameters.

If one channel operation is designated, data blocks 0, 1 and 2 are used for Tx, while data blocks 3, 4 and 5 are used for Rx.

Once the operation mode has been designated, the BS flags of the Tx data blocks in that operation mode are set. The BS flags are reset when the initial communication has been completed after the specification of the mode.

(Communication)

A packet communication carried out by an IPC will be described below in detail.

A packet is constructed by a header (H), an address (A), data (Dn), and a checksum (CK), as shown in FIG. 15.

Figures 16, 17:
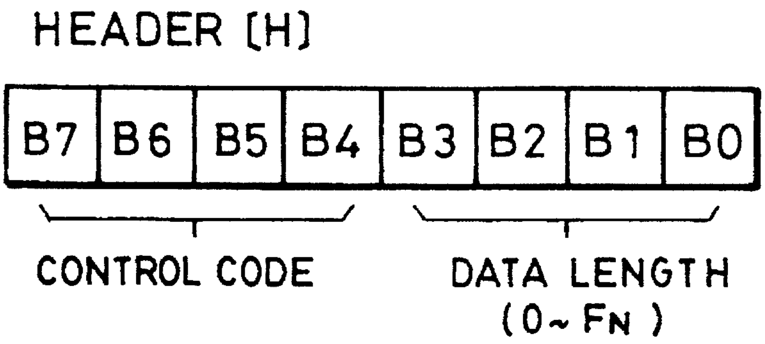
FIG. 16 shows the structure of a header portion of the packet.
FIG. 17 shows a relationship between the types of packet and control codes.

In the header, the four leftmost bits (B7 to B4 shown in FIG. 16) represent the type of a packet. There are six types of packet, including final packet (Pe), resend request code (Pr), initial communication request code (Ps), continuation packet (P), idling packet (Pi), and cancel code (Pc) (see FIG. 17). The four rightmost bits in the header (B3 to B0 in FIG. 16) represent the data length which ranges from 0 to 16 bytes.

The address portion in the packet represents the address of the data (DO) which is transmitted subsequent to the address data.

The data portion is capable of containing 16 bytes of data at maximum.

The checksum portion is affixed to the end of a packet. The contents thereof represent an inverted value of the sum of the data contained in a packet (the sum being obtained by ignoring carry).

(Types of Packet)

Continuation packet (P) indicates that it is followed by another packet to be transmitted. The length of this packet ranges from 4 bytes to 19 bytes.

Final packet (Pe) denotes that there are no subsequent packets to be transmitted. The length of this packet ranges from 5 bytes to 19 bytes.

Idling packet (Pi) contains only the memory checksum D0 of the transmission address. The length of this packet is 4 bytes.

Resend request (Pr) represents a request to resend a packet. The length of this packet is 1 byte.

Initial communication request (Ps) represents a request of transfer of all the data. The length of this packet is 1 byte.

Figure 18:
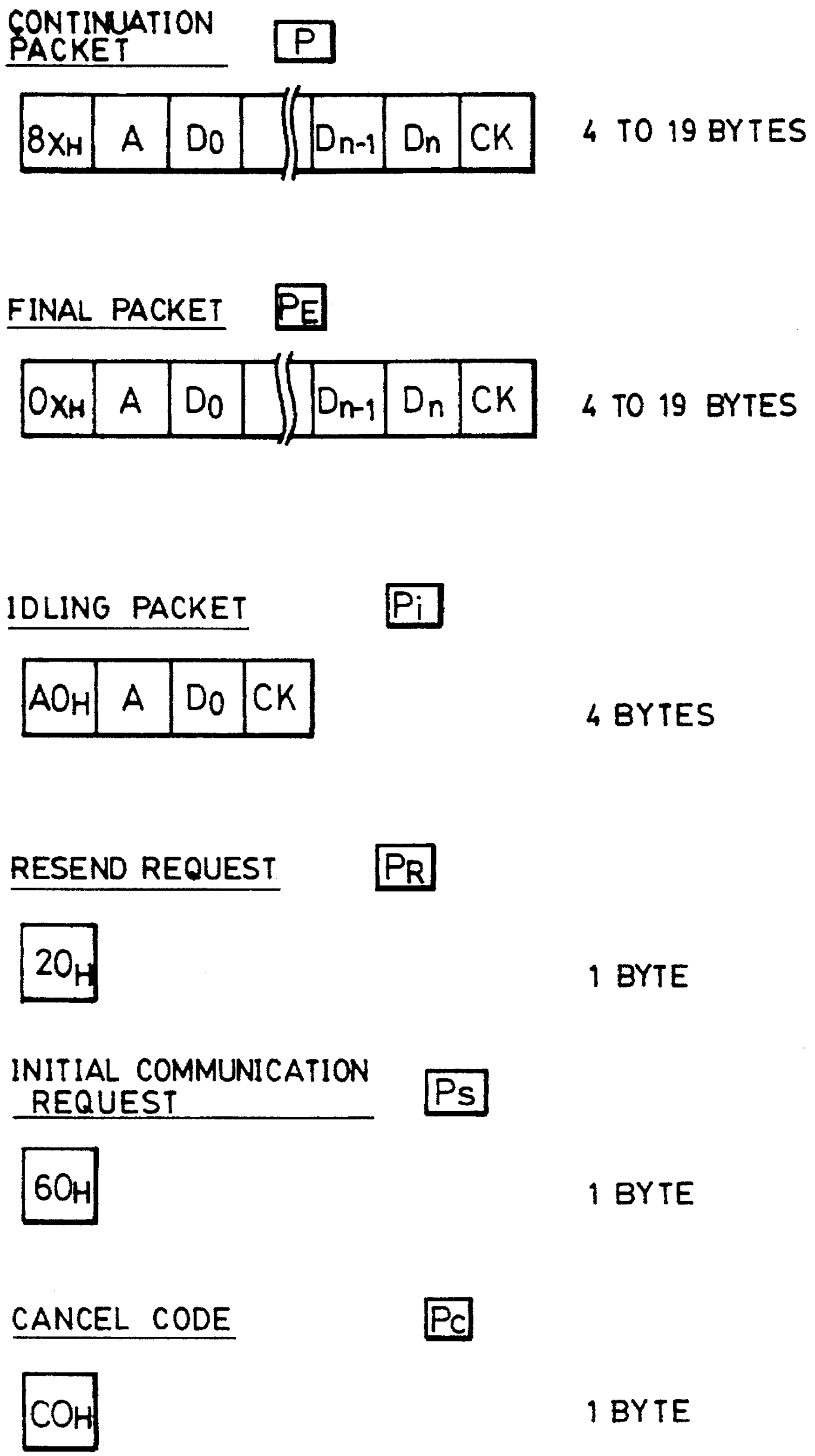
FIG. 18 shows the internal structure of each of the packets of FIG. 17.

Cancel code (Pc) is transmitted as a response to Pr. It means that the packet which is being transmitted or which has been transmitted is to be cancelled. This packet has a length of 1 byte (as for types of packet, see FIG. 18).

(Communication Interval)

Figure 19:
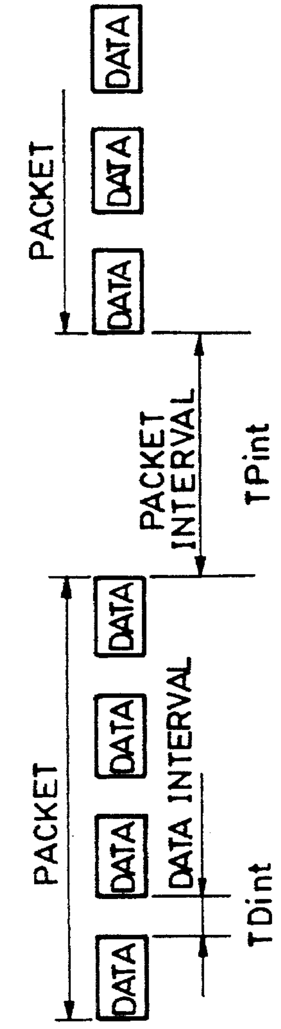
FIG. 19 is a timing chart, showing an example of the timing at which packets are transmitted.

As shown in FIG. 19, packets are transmitted at time intervals (TPint) corresponding to 700 μs (in the case of 96 kbps) or 2000 μs (in the case of 48 kbps) during communication. In a packet, data is transmitted at time intervals (TD int) corresponding to 100 μs to 330 μs.

(Communicating Timing)

1. Initial Communication (Power On)

Figure 20:
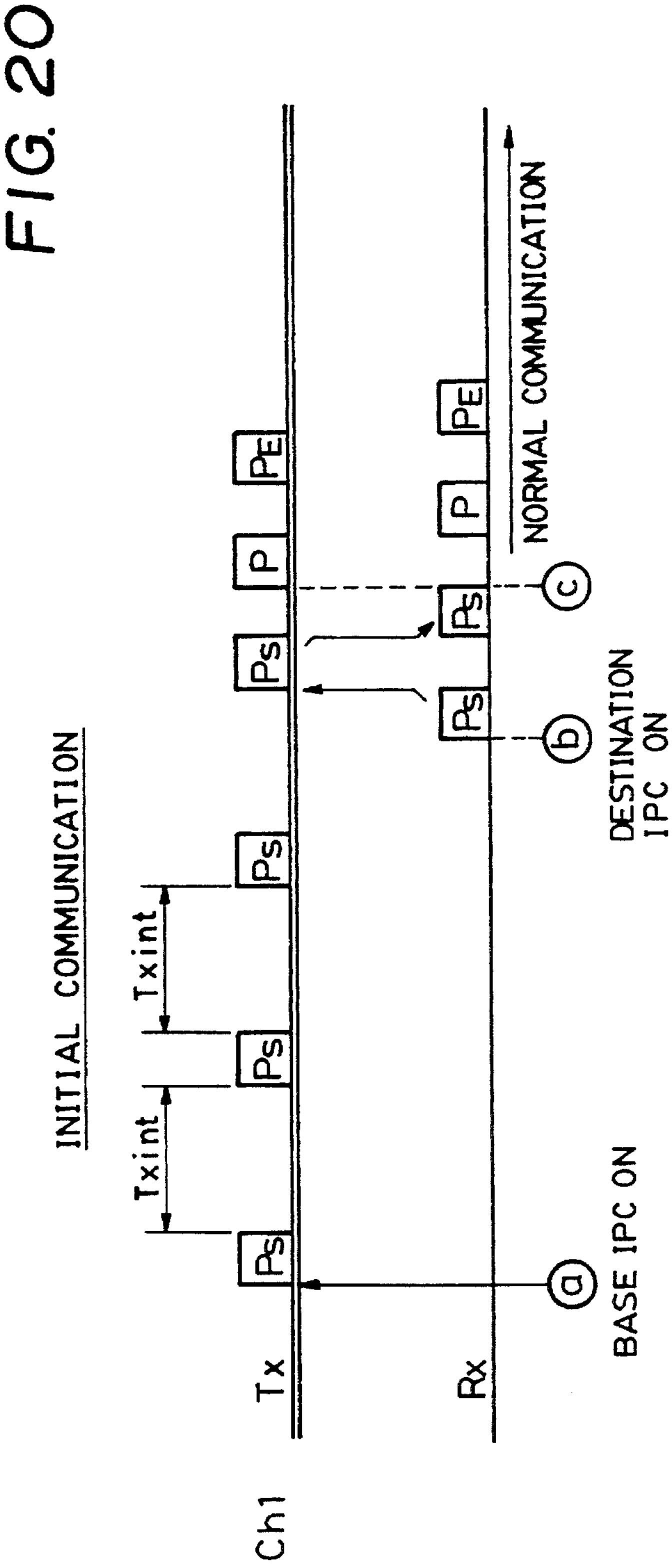
FIG. 20 is a timing chart, showing how a communication is started.

As shown in FIG. 20, when a base IPC is switched on at a time indicated by â in FIG. 20, it begins transmitting initial communication requests Ps at time intervals of Txint. It receives Ps from a destination IPC when the destination IPC is activated at a time indicated by $\hat{b}$. Thereafter, the base IPC transmits Ps, by which means normal communication is started at a time indicated by ĉ (in FIG. 20, TXint=4 ms).

2. Normal Communication

Figure 21:
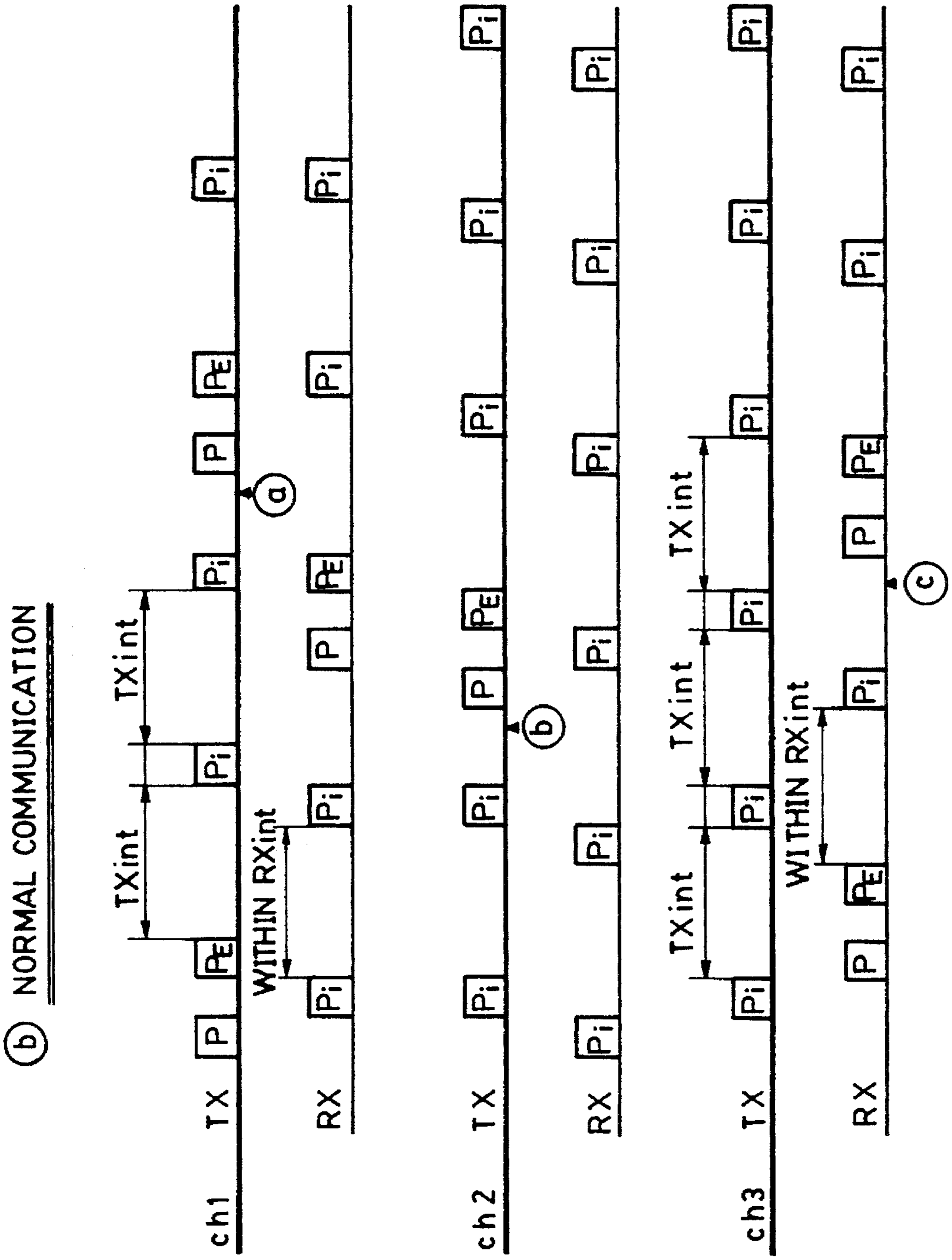
FIG. 21 is a timing chart, showing a normal communication.

Communication is controlled independently in three channels, as shown in FIG. 21. When no external event (transmission request from a host CPU or receipt request from a remote IPC) is detected, idling packets Pi are transmitted at time intervals of Txint. Once an event occurs (transmission request from the host CPU at times indicated by â and $\hat{b}$ and the receipt of data from a remote IPC at a time indicated by ĉ), P and Pe are transmitted or received, as stated above (in FIG. 21, Txint: 4 ms, Rxint: 12 ms).

3. Occurrence and Recovery of Communication Error

The IPC has the function of automatically recovering errors that occur in the received data for each channel.

Errors generated by communication line fall into parity errors, checksum errors and framing errors. Errors may also be generated by data loss due to excessive communication, resetting of a destination IPC, and power off.

Figure 22:
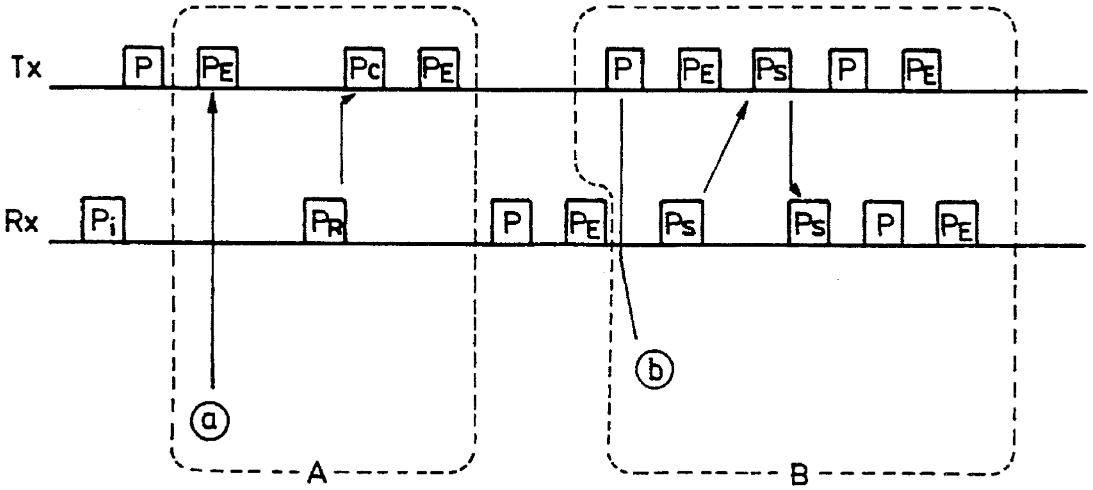
FIG. 22 is a timing chart, showing the occurrence of a communication error and automatic error recovery by means of an IPC.

As shown in FIG. 22, when an error occurs during the receipt of a packet Pe or Pi (as indicated by â in FIG. 22), the IPC transmits Pr that indicates a request of resend of that packet, and then waits for the destination IPC to transmit Pc response and that packet (FIG. 22 â).

When data is lost due to resetting or when an error occurs during receipt of P packet (as indicated by $\hat{b}$ in FIG. 22), the IPC transmits Ps to recover the communication data (FIG. 22 $\hat{b}$).

If the communication error is not recovered after the above-described error recovery processes have been executed, the IPC writes the channel on which an error is occurring in the ERR register and the type of that error in the ERRn (n=1, 2, 3, n representing an error channel), respectively. Concurrently with this, the IPC initiates an interrupt request.

Figure 23:
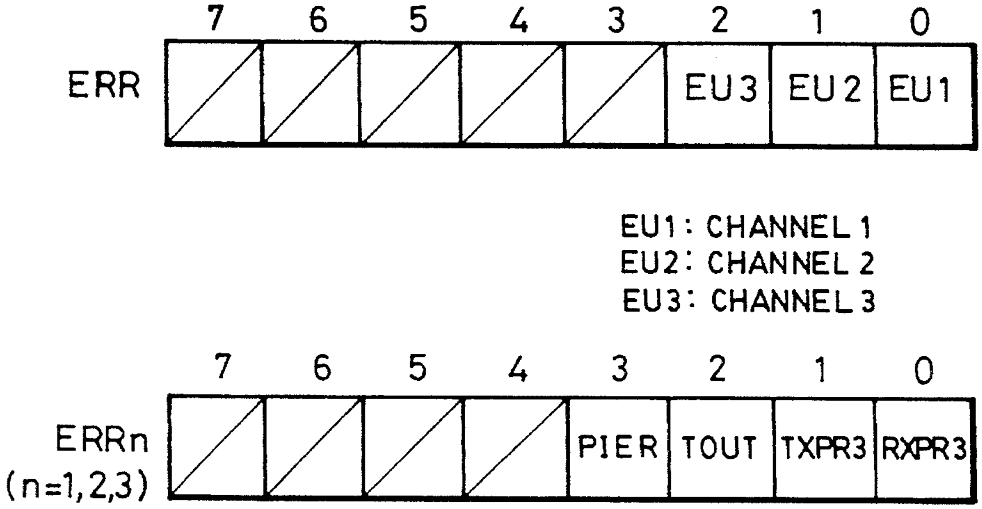
FIG. 23 shows the structure of an error register.

In the ERR register, "1" is set in the bit corresponding to the channel on which error is occurring (EU1: channel 1, EU2: channel 2, EU3: channel 3, as shown in FIG. 23).

In the ERRn register, "1" is set in the bit corresponding to the type of error in a register corresponding to the error channel (RXPR3: transmission of the same packet three times, TXPR3: transmission of the same packet three times during the receipt of a packet, TOUT: received data error, PIER: disagreement of the checksum of the Tx data blocks in the remote IPC and the checksum of the Rx data blocks in the base IPC).

4. Collation of Memory Checksums by means of Pi Packet and Collation Error

As stated above, Pi packet contains the memory checksum (D0). When the IPC receives Pi packet, it checks if D0 of that packet coincides with the memory checksum D0 of its receipt data block. If they disagree, the IPC transmits Ps, requesting initial communication. In this way, data in the Rx data block of the base IPC is kept coincident with the data in the Tx data block of the remote IPC.

5. Delay Timeout of Data to be Received

If no data is received for 12 ms or more, a timeout error occurs. The IPC transmits initial communication request Ps and waits for a remote IPC to return.

6. Conditions of Communications

Data transfer starts when the host CPU sets BS of the transmission block or when about 100 ms have elapsed without BS flag being set after updating of the data by the host CPU (BS is reset 2 ms after the completion of data transfer).

Data transfer also starts when a data error occurs for unknown reasons and an initial communication request is thus transmitted or received.

Upon receipt of a transmission request, the IPC detects the position at which the updated data is stored in the Tx block, and transmits the data located at the area ranging from the uppermost address to the lowermost address as a packet. In this way, data can be communicated efficiently.

Figure 24:
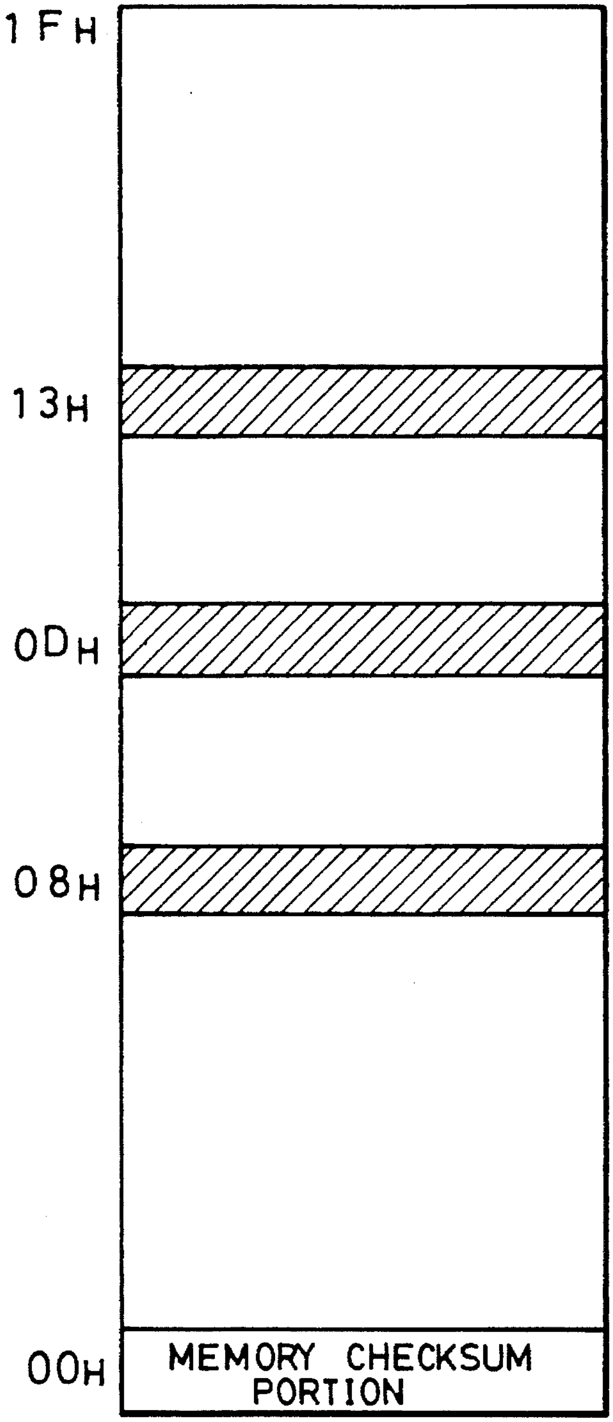
FIG. 24 shows optimization performed when data is transmitted.

In the example illustrated in FIG. 24, the IPC detects the updated data (the hatched portions in FIG. 24) (by detecting the changes in the access flags), and transmits it as a Pe packet which contains 12 bytes from 08H to 13H.

If the detected data exceeds 16 bytes, it is transmitted as a packet P containing 16 bytes of data and a packet Pe containing the remaining data.

The data in a packet is transmitted starting with that located at the uppermost address.

(Applications)

The IPC is accessed by the host CPU in the manner described below.

Figure 4:
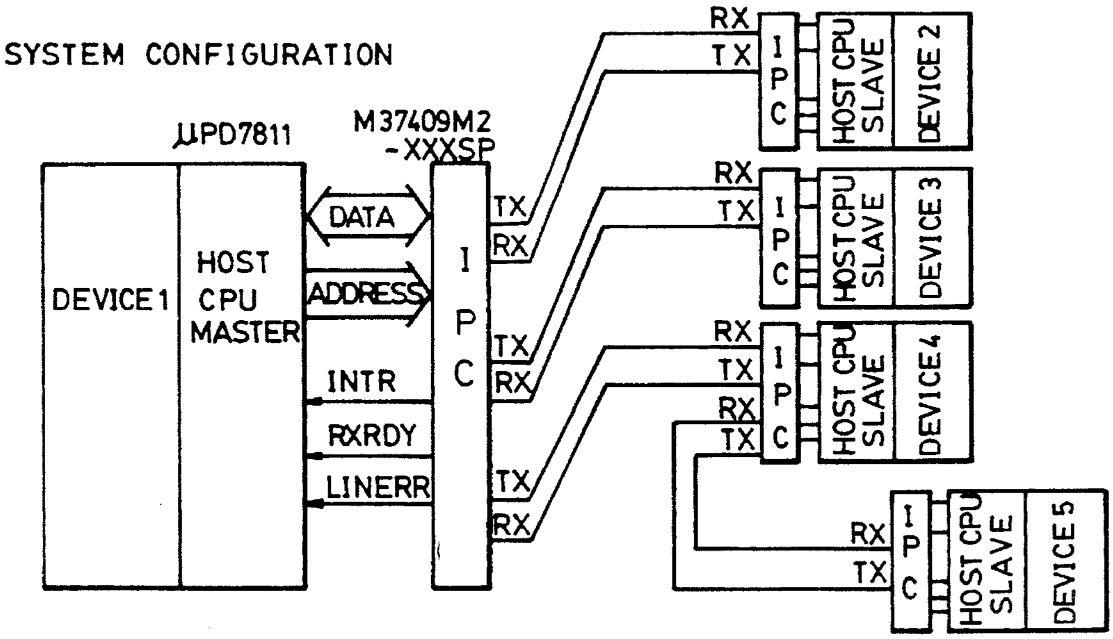
FIG. 4 is a block diagram of a system configuration.

The IPC is accessed in the same way as that in which an external memory (RAM or the like) is accessed by the host CPU in hardware terms, detailed description thereof being omitted here (see FIG. 4).

The software involves the following processes.

(Initialization)

Figure 25:
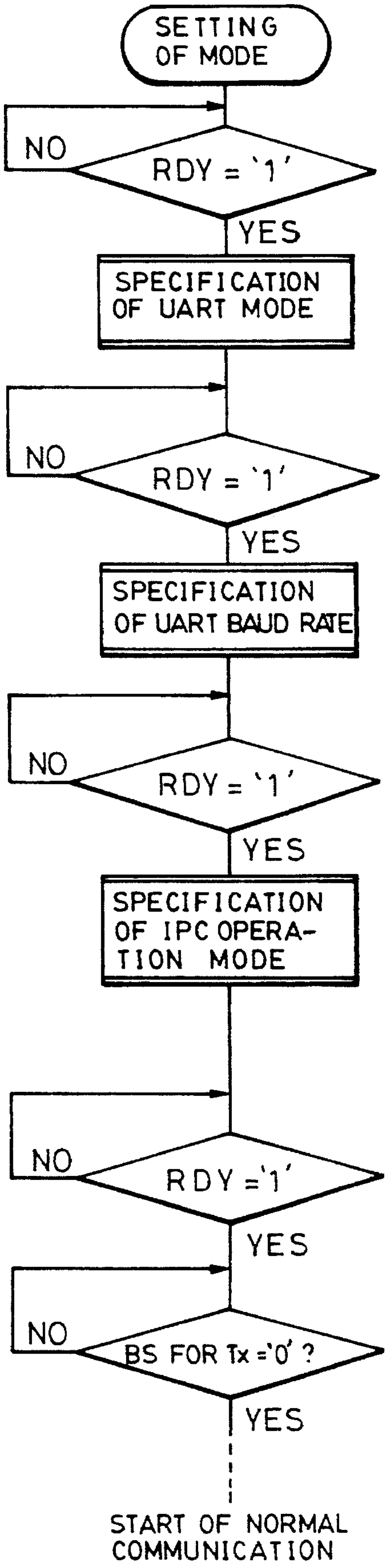
FIG. 25 is a flowchart of a procedure for initializing an IPC.

After the CPU has confirmed that "1" has been set in the ready flag (IPC—RDY) in the communication register area, it specifies the UART mode, UART baud rate and IPC operation mode. As stated above, both the UART mode and the UART baud rate can be set independently for three channels. BS for the Tx block of a channel to be used is set to "0" when the specification of the mode has been completed, thereby completing the initialization (see FIG. 25). Since the three channels are operated in an equivalent manner during a three channel mode operation, the following description exemplifies a case in which channel 1 is used.

(Transmission)

In a case where the host CPU has data that it desires to transmit, the local CPU first confirms that "0" is set in BS0, that is, that the IPC has completed the previous transmission process, writes data to be transmitted at desired addresses in the Tx block, and then sets "1" in BS0, whereupon the data is automatically transmitted.

Figure 26:
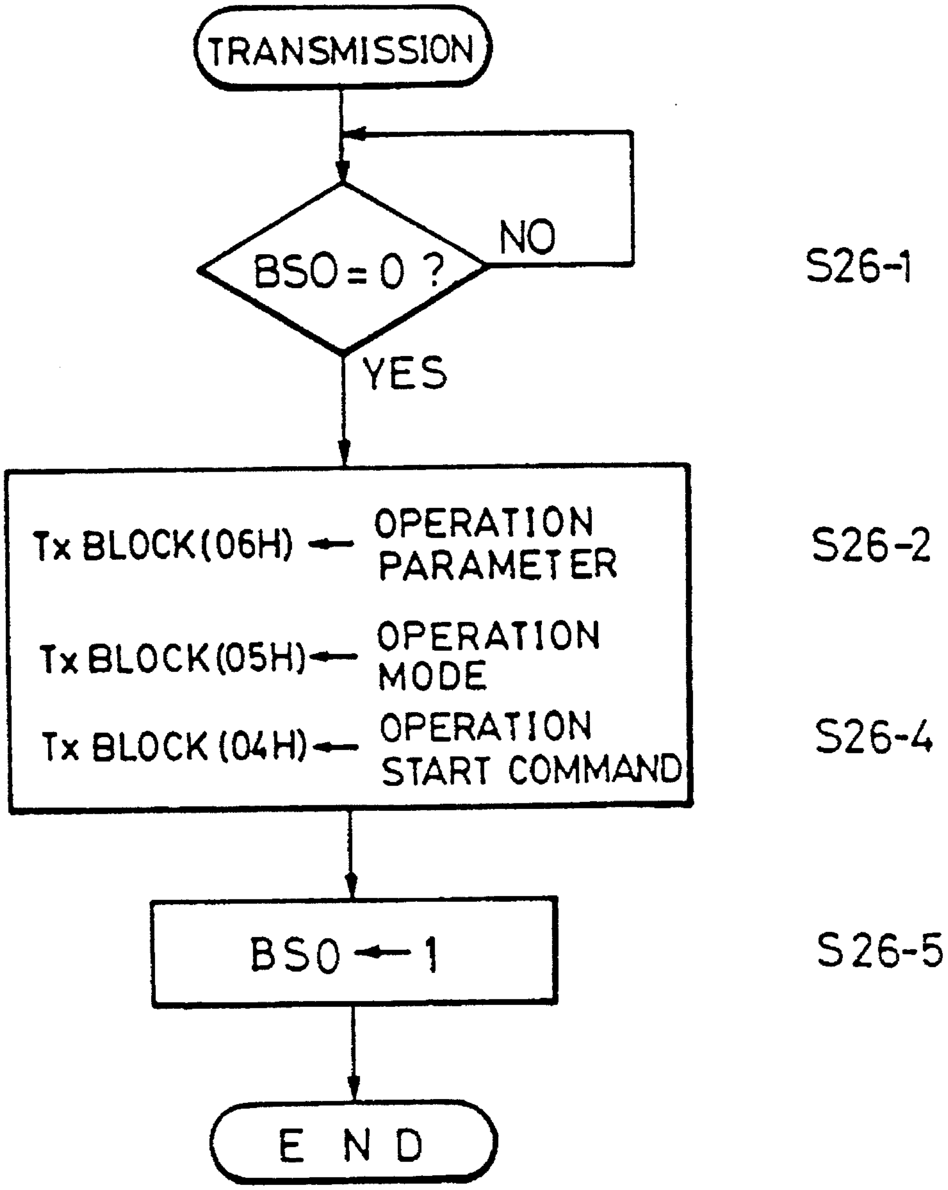
FIG. 26 is a flowchart of a data transmission procedure.

FIG. 26 shows an example in which the operation start command is transmitted from the copier body to an additional device. In this case, it is assumed that 3 bytes of data including "operation mode", "operation parameter" and "operation start command" are required to start the operation.

First, it is determined whether or not "0" is set in BS0 (in step S26-1). If the answer is affirmative, "operation parameter" is stored at 06H in the TX block in the IPC (in S26-2), "operation mode" is stored at 05H in the TX block (in step S26-3), and "operation start command" is stored at 04H in the TX block (in S26-4). Thereafter, "1" is set in BS0 to start the transmission (in S26-5). At this time, even if the BS0 is not set, transmission starts after about 100 ms, as stated above. In this way, the data in the TX block is transmitted starting with the upper address, which means that the data reaches a destination (an addition device) in the order of "operation parameter", "operation mode" and "operation start command". In consequence, the data to be transmitted needs to be stored in the TX block with only the transmission priority taken into consideration. This eliminates troublesome priority processing of the data to be transmitted, which is conducted at the time of actual transmission, simplifying the communication processing in a case where the amount of complicated data to be transmitted is large.

In the above-described example, only channel 1 is used for communication. However, since the three channels are operated independently from each other, even when data is transmitted through the three channels simultaneously, transmission is performed on the three channels separately, increasing the transmission efficiency and facilitating transmission operations.

(Receipt)

Figure 27:
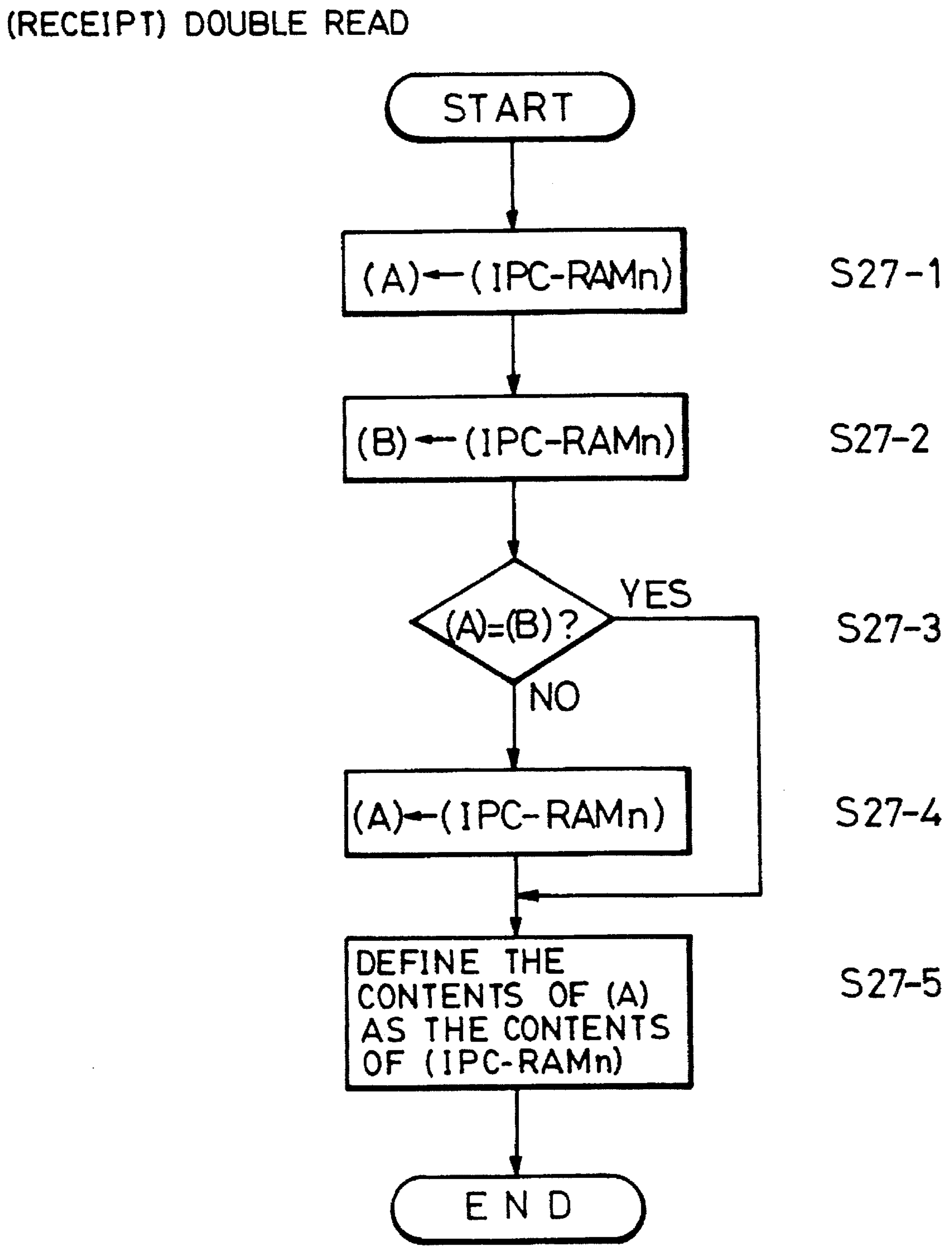
FIG. 27 is a flowchart of a procedure for receiving data.

When the host CPU desires to read the data received, it can access the IPC and read the data stored in it in the same manner as that in which it reads data from a RAM or the like. However, in a case where the same memory cell is concurrently accessed from the IPC for writing and from the host CPU for reading, the data to be read becomes undefined. This problem, however, can be solved by reading the data in the RAM twice. For example, as shown in FIG. 27, the contents of a desired address are loaded in an accumulator (Step 27-1), the contents of that address are loaded in another register (Step 27-2), and the contents of the accumulator are compared with those in the register (Step 27-3). If they coincide with each other, the contents of the accumulator are defined as being the received data (Step S27-5). If they do not agree, the contents of the accumulator loaded the second time are defined as being the received data (Step S27-4).

Figure 28:
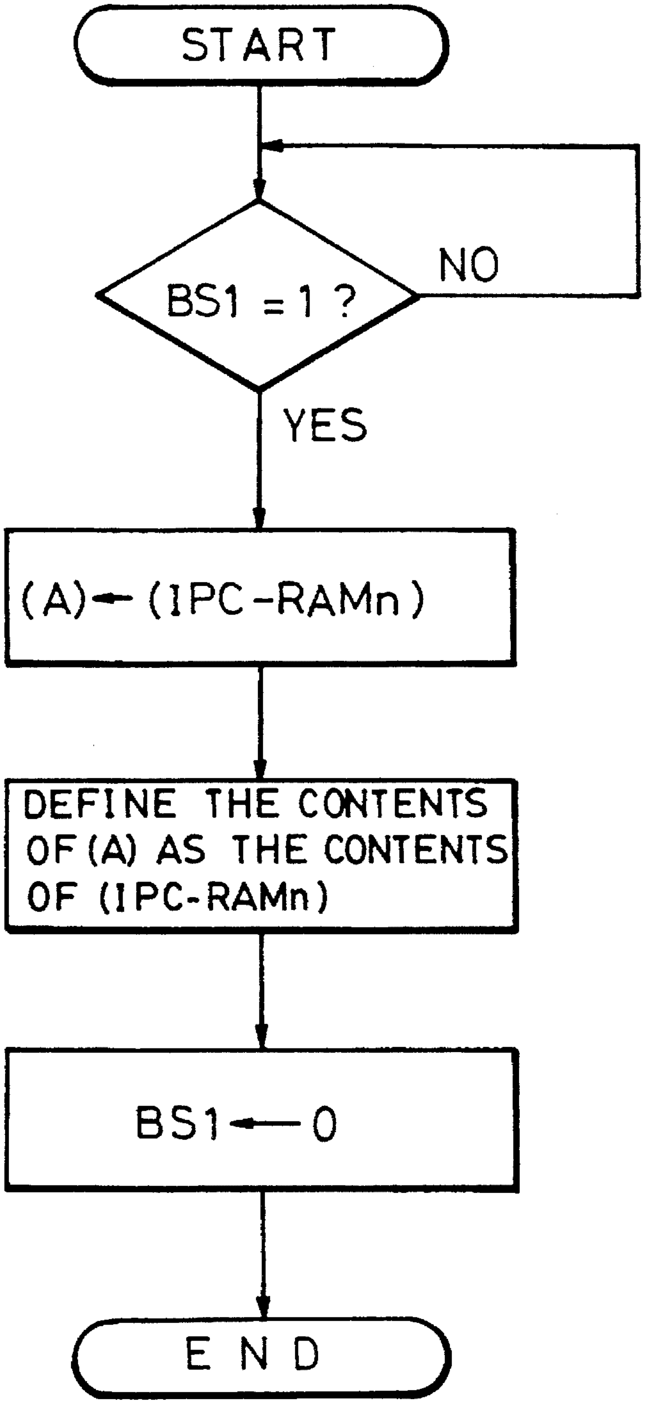
FIG. 28 is a flowchart of another procedure for receiving data.

In another example, data is read out by the host CPU from the dual port RAM after it has been confirmed that "1" is set in BS1. In this case, it is necessary for the host CPU to reset BS1 to "0" after it has read out the data (see FIG. 28).

(Error Processing)

In a case where error status is set in "INTRA" terminal or in the error register, the host CPU is capable of processing the error freely in accordance with the system configuration.

Figure 29:
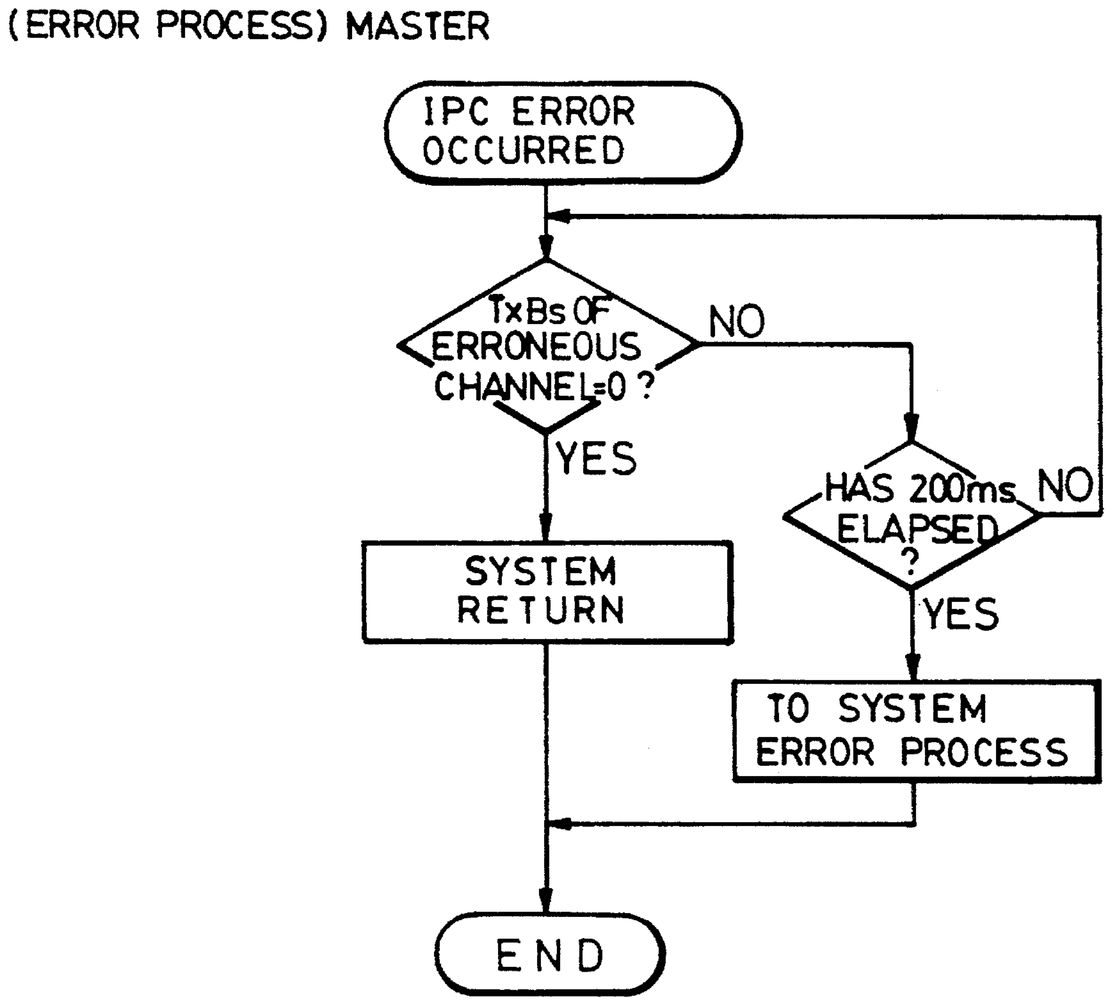
FIG. 29 is a flowchart of error processing executed by a system master when an IPC error occurs.

In this embodiment, an error is processed in the master device (the copier body) of the system in the manner shown in FIG. 29. That is, if the error is not automatically recovered by the IPC within 200 ms after the occurrence thereof, the flow goes to the system error processing. At this time, a display displays the fact that a system error is occurring. Further, three errors which occur within the passage of 1 second also generate a system error.

Figure 30:
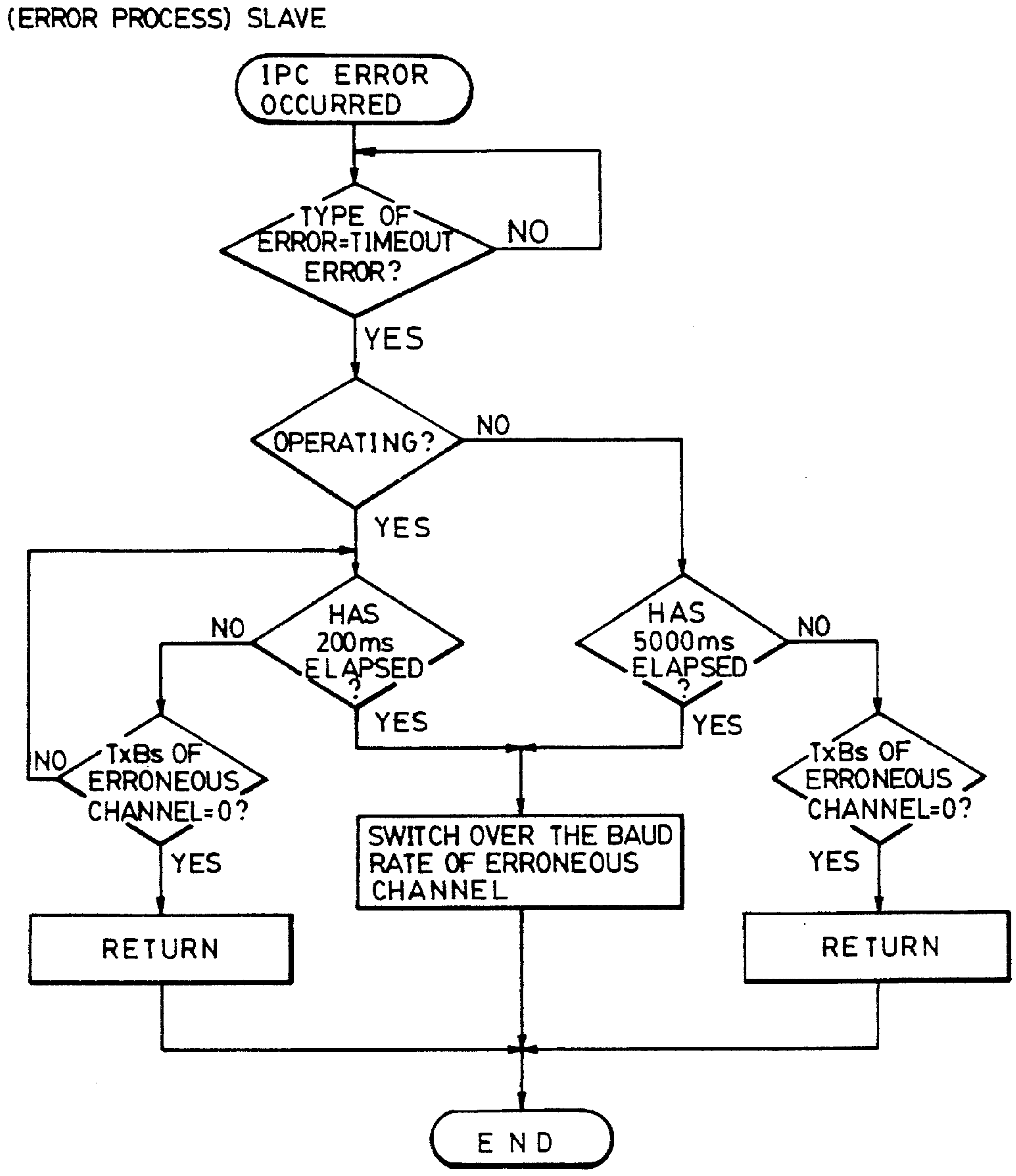
FIG. 30 is a flowchart of error processing executed by a system slave when an IPC error occurs.

Further, when the communication line is disconnected on the transmission side, the IPC does not in principle set error status. Accordingly, no error status is generated in the master device when the transmission line of the master device is disconnected. However, this causes a timeout error to be generated on the receipt side. In consequence, a slave device (the RDF or sorter in this embodiment) generates a timeout error, and if the IPC does not automatically recover from the error within a preset time interval (within 200 ms in a case where the device is operating and within 5000 ms in a case where the device is not operating, as shown in FIG. 30), the communication baud rate of the IPC is switched over so as to allow an error to be generated in the master device (the copier body in this embodiment) and a system error to be displayed (see FIG. 30). The above-described master-slave relationship is distinct from the master-slave relationship employed for communications and is adopted only for error processing.

The above description exemplifies a system made up of a copier and additional devices. However, the present invention is not limited to such a system; it can be applied to any system in which data is communicated between a plurality of devices. For example, as illustrated in FIG. 4, a representative system configuration may include a plurality of devices such as DEVICE 1, DEVICE 2, DEVICE 3, DEVICE 4 and DEVICE 5, each having an associated IPC.

As will be understood from the foregoing description, data communications are controlled in a system according to the invention independently of the control of the relevant devices. This prevents delay in the exchange of data, and ensures highly accurate system control.

What is claimed is:

1. A communication control apparatus, comprising:

a first control means for controlling a device;

a data storage means accessed at random by said first control means;

a communication means for performing communication of data with another apparatus; and a second control means for controlling said communication means to transmit data stored in said data storage means into said another apparatus in accordance with an update of data in said data storage means performed by said first control means.

2. A communication control apparatus according to claim 1, wherein said device is an image forming apparatus for forming an image on a sheet.

3. A communication control apparatus according to claim 2, wherein said second control means is adapted to read the data stored in said data storage means in predetermined order, and said another apparatus is adapted to write the data into memory means in said another apparatus.

4. A communication control apparatus according to claim 3, further comprising:

an error detection means for detecting an error or communication at said communication means, wherein when said error detection means detects an error of communication during communication of data stored in said temporary storage means, said communication means resends the data to be communicated.

5. A communication control apparatus according to claim 4, wherein said error of communication is any of a parity error, an overrun error, a framing error or any combination thereof.

6. A communication control apparatus according to claim 4, further comprising:

a count means for counting the number of errors of said communication means and for informing of an abnormality of the communication when the number of errors of said error count means exceeds a predetermined value.

7. A communication control apparatus according to claim 1, wherein said data storage means and memory means in said another apparatus have a plurality of storage regions, further comprising:

an access storage means, corresponding to each of said plurality of storage regions, for storing a presence of an access to said each of said plurality of storage regions; and wherein said second control means is adapted to transmit the data stored in said plurality of storage regions and accessed on the basis of the presence of an access stored in said access storage means.

8. A communication control apparatus according to claim 7, wherein all the contents of said access storage means are returned to an absent state of an access after said communication means has transmitted the data.

9. A communication control apparatus according to claim 1, wherein said data storage means and memory means in said another apparatus have a transmission region for storing data to be transmitted and a reception region for storing received data, and said second control means is adapted to transmit the data stored in said transmission region within said data storage means into said reception region within said memory means, or to receive the data stored in said transmission region within said memory means into said reception region within said data storage means.

10. A communication control apparatus according to claim 9, further comprising:

an operation means for operating the data stored in said data storage means; and wherein said communication means is adapted to receive a result of an operation on data stored in said reception region within said memory means at every predetermined interval, and to transmit the data stored in said transmission region within said data storage means into said reception region within said memory means when a result of an operation data stored in said transmission region within said data storage means is different from a result of an operation data stored in said reception region within said memory means.

11. A communication control apparatus according to claim 9, further comprising:

an operation means for operating the data stored in said data storage means; and wherein said communication means is adapted to transmit a result of operation on data stored in said transmission region within said data storage means when the data stored in said transmission region within said data storage means is transmitted to said reception region within said memory means, and to resend the data stored in said transmission region within said data storage means when a result of operation on data stored in said transmission region within said data storage means is different from a result of operation on data stored in said reception region within said memory means.

12. A communication control apparatus according to claim 1, wherein said communication means includes a temporary storage means for temporarily storing data, said communication means being adapted to transmit the data stored in said data storage means to said another apparatus after storing data in said temporary storage means, and said communication means further being adapted to resend the data stored in said temporary storage means to said another apparatus when said detection means detects an error of communication.

13. A communication control apparatus according to claim 1, wherein the communication means communicates data between said data storage means and memory means in said another apparatus without interfering with the controlling of said first control means.

14. A communication control apparatus according to claim 1, wherein said communication means is adapted to make the data stored in said data storage means and the data stored in memory means in said another apparatus identical.

15. A communication control apparatus according to claim 1, wherein said device is to store the sheet.

16. A communication control apparatus according to claim 1, wherein said device is for handling an original image.

* * * * *

UNITED STATES PATENT AND TRADEMARK OFFICE
CERTIFICATE OF CORRECTION

PATENT NO. : 5,455,688

DATED : October 3, 1995

INVENTORS : Hideaki Furukawa, et al.

It is certified that error appears in the above-identified patent and that said Letters Patent is hereby corrected as shown below:

COLUMN 12

Line 36, "â" should read --ⓐ--;
Line 39, "b̂" should read --ⓑ--;
Line 41, "ĉ" should read --ⓒ--;
Line 49, "â and b̂" should read --ⓐ and ⓑ--;
Line 50, "ĉ)," should read --ⓒ),--;
Line 60, "â" should read --ⓐ--;
Line 63, "(FIG. 22â)." should read --(FIG. 22ⓐ).--;
Line 65, "b̂" should read --ⓑ--; and
Line 67, "22b̂)." should read --22ⓑ).--.

COLUMN 16

Line 5, "temporary storage" should read --communication--.

Signed and Sealed this

Twenty-sixth Day of December, 1995

Attest:

BRUCE LEHMAN

*Attesting Officer*

*Commissioner of Patents and Trademarks*